US012710625B2

(12) United States Patent
Lim et al.

(10) Patent No.: US 12,710,625 B2
(45) Date of Patent: Aug. 18, 2026

(54) IMAGING LENS SYSTEM

(71) Applicants: SAMSUNG ELECTRO-MECHANICS CO., LTD., Suwon-si (KR); KUMOH NATIONAL INSTITUTE OF TECHNOLOGY INDUSTRY-ACADEMIC COOPERATION FOUNDATION, Gumi-si (KR)

(72) Inventors: Tae Yeon Lim, Suwon-si (KR); Yong Joo Jo, Suwon-si (KR); Phil Ho Jung, Suwon-si (KR); Jae Myung Ryu, Gumi-si (KR)

(73) Assignees: Samsung Electro-Mechanics Co., Ltd., Suwon-si (KR); KUMOH NATIONAL INSTITUTE OF TECHNOLOGY INDUSTRY-ACADEMIC COOPERATION FOUNDATION, Gumi-si (KR)

( * ) Notice: Subject to any disclaimer, the term of this patent is extended or adjusted under 35 U.S.C. 154(b) by 497 days.

(21) Appl. No.: 17/569,940

(22) Filed: Jan. 6, 2022

(65) Prior Publication Data

US 2023/0071059 A1 Mar. 9, 2023

(30) Foreign Application Priority Data

Aug. 30, 2021 (KR) ........................ 10-2021-0114397

(51) Int. Cl.

| | |
|---|---|
| ***G02B 13/06*** | (2006.01) |
| ***G02B 9/64*** | (2006.01) |
| ***H04N 23/698*** | (2023.01) |

(52) U.S. Cl.
CPC ............... *G02B 13/06* (2013.01); *G02B 9/64* (2013.01); *H04N 23/698* (2023.01)

(58) Field of Classification Search
CPC ...... G02B 9/64; G02B 13/0045; G02B 13/06; G02B 13/02; G02B 13/009; H04N 23/698
See application file for complete search history.

(56) References Cited

U.S. PATENT DOCUMENTS

| | | | |
|---|---|---|---|
| 9,091,843 | B1 | 7/2015 | Hudyma et al. |
| 9,541,738 | B2 | 1/2017 | Kubota et al. |

(Continued)

FOREIGN PATENT DOCUMENTS

| | | | |
|---|---|---|---|
| CN | 101995647 | A | 3/2011 |
| CN | 110716287 | A | 1/2020 |

(Continued)

OTHER PUBLICATIONS

Korean Office Action issued on Feb. 15, 2024, in counterpart Korean Patent Application No. 10-2021-0114397 (7 pages in English, 6 pages in Korean).

(Continued)

*Primary Examiner* — Ephrem Z Mebrahtu
(74) *Attorney, Agent, or Firm* — NSIP Law

(57) ABSTRACT

An imaging lens system includes a first lens, a second lens, a third lens, a fourth lens, a fifth lens, a sixth lens, and a seventh lens, sequentially disposed from an object side. A field of view (FOV) of the imaging lens system according to an embodiment is wider than 85 degrees and narrower than 160 degrees. In the imaging lens system according to an embodiment, a distance (TTL) from an object-side surface of the first lens to an imaging plane is greater than 6.0 mm and less than 9.0 mm.

21 Claims, 17 Drawing Sheets

(56) References Cited

U.S. PATENT DOCUMENTS

2013/0010372 A1* 1/2013 Chou ............. G02B 15/143507 359/689
2013/0201382 A1* 8/2013 Ueda .................... G02B 13/009 359/689
2016/0147050 A1* 5/2016 Fujikura .............. H04N 23/663 359/689
2019/0101728 A1* 4/2019 Hsieh ....................... G02B 9/64
2019/0278062 A1 9/2019 Chen
2020/0012078 A1* 1/2020 Kuo ....................... G02B 13/18
2020/0310083 A1* 10/2020 Kim ................... G02B 13/0045
2020/0333569 A1* 10/2020 Kondo ..................... G02B 9/62
2020/0400921 A1* 12/2020 Huang ..................... G02B 9/64
2020/0400924 A1 12/2020 Xu et al.
2020/0409120 A1 12/2020 Kubota et al.
2020/0409121 A1 12/2020 Wang et al.
2021/0041666 A1 2/2021 Hoshi
2021/0088751 A1 3/2021 Kubota et al.
2021/0181468 A1 6/2021 Makino et al.
2021/0199933 A1 7/2021 Wang et al.
2022/0075163 A1* 3/2022 Tang .................... G02B 15/143
2022/0342185 A1 10/2022 Li et al.
2022/0365317 A1* 11/2022 Chen .................. G02B 13/0045
2022/0397742 A1 12/2022 Zhang et al.
2023/0236389 A1* 7/2023 Ho ......................... G02B 13/18 359/708
2023/0367101 A1* 11/2023 Zhang ................ G02B 13/0045
2024/0027732 A1* 1/2024 Sin ........................... G02B 9/64
2024/0134165 A1* 4/2024 Zhang .................... G02B 13/06
2024/0264411 A1* 8/2024 Sin ........................... G02B 9/64

FOREIGN PATENT DOCUMENTS

CN 111812805 A 10/2020
CN 112817126 A 5/2021
CN 113031211 A 6/2021
CN 113189752 A 7/2021
CN 113204103 A 8/2021
CN 113238346 A 8/2021
CN 113267877 A 8/2021
JP 2007-232996 A 9/2007
JP 2009-25534 A 2/2009
JP 2014-48488 A 3/2014
JP 2016-126086 A 7/2016
KR 10-2018-0071015 A 6/2018
KR 10-2019-0081934 A 7/2019
TW I647511 B 1/2019
TW 201940919 A 10/2019
TW 202122853 A 6/2021

OTHER PUBLICATIONS

Forbes, G. W. "Shape specification for axially symmetric optical surfaces." Optics express 15.8 (2007): 5218-5226. (9 pages in English).

Taiwanese Office Action issued on Sep. 2, 2022, in counterpart Taiwanese Patent Application No. 111101961 (11 pages in English and 10 pages in Chinese).

Taiwanese Office Action issued on Mar. 7, 2025, in corresponding Taiwanese Patent Application No. 113120944. (7pages in English, 5pages in Taiwanese).

Korean Office Action issued on Oct. 24, 2024, in counterpart Korean Patent Application No. 10-2021-0114397 (6 pages in English, 5 pages in Korean).

Korean Office Action Issued on Jun. 25, 2025, in Counterpart Korean Patent Application No. 10-2021-0114397 (10 Pages in English, 8 Pages in Korean).

Chinese Office Action Issued on Jul. 3, 2025, in Counterpart Chinese Patent Application No. 202210251138.3 (3 Pages in English, 6 Pages in Chinese).

Taiwanese Office Action Issued on Aug. 19, 2025, in Counterpart Taiwanese Patent Application No. 113120944 (7 Pages in English, 6 Pages in Chinese).

* cited by examiner

IMAGING LENS SYSTEM

CROSS-REFERENCE TO RELATED APPLICATIONS

This application claims the benefit under 35 USC 119(a) of Korean Patent Application No. 10-2021-0114397 filed on Aug. 30, 2021, with the Korean Intellectual Property Office, the entire disclosure of which is incorporated herein by reference for all purposes.

BACKGROUND

1. Field

The present disclosure relates to an imaging lens system capable of adjusting focal magnification.

2. Description of the Background

A portable electronic device may include a camera module for taking pictures or recording videos. For example, the camera module may be mounted in a mobile phone, a notebook computer, a game machine, or the like. Portable electronic devices are generally manufactured to be thin or small in order to increase portability. Therefore, the camera module mounted in the portable electronic device may be configured to have a limited type of imaging lens system. For example, the camera module may include an imaging lens system having a fixed focal length. However, it may be difficult for an imaging lens system having a fixed focal length to exhibit high optical properties.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, and a seventh lens, sequentially disposed from an object side, wherein a field of view (FOV) is wider than 85 degrees and narrower than 160 degrees, and wherein a distance (TTL) from an object-side surface of the first lens to an imaging plane is greater than 6.0 mm and less than 9.0 mm.

The first lens may have negative refractive power.

The fourth lens may have positive refractive power.

The fourth lens may have a convex object-side surface.

The fifth lens may have a convex object-side surface.

The sixth lens may have a concave object-side surface.

The following conditional expression may be satisfied, $25<FOVw/fw<60$, where FOVw is a field of view in a wide-angle mode of the imaging lens system, and fw is a focal length in a wide-angle mode of the imaging lens system.

The following conditional expression may be satisfied, $15<FOVw/TTLw<25$, where TTLw is a distance from an object-side surface of the first lens to an imaging plane in a wide-angle mode of the imaging lens system.

The following conditional expression may be satisfied, $2.0<D12/D45<17$, where D12 is a distance from an image-side surface of the first lens to an object-side surface of the second lens, and D45 is a distance from an image-side surface of the fourth lens to an object-side surface of the fifth lens.

The following conditional expression may be satisfied, $1.0<TTLw/TTLt<1.1$, where TTLt is a distance from an object-side surface of the first lens to the imaging plane in a telephoto mode of the imaging lens system.

A camera module may include the imaging lens system, and an image sensor having the imaging plane disposed in a position in which light incident through the first lens to the seventh lens is formed.

In another general aspect, an imaging lens system includes a first lens having negative refractive power and a convex object-side surface, a second lens having negative refractive power, a third lens having refractive power, a fourth lens having refractive power and a concave image-side surface, a fifth lens having refractive power, a sixth lens having refractive power and a concave object-side surface, and a seventh lens having negative refractive power, wherein the first to seventh lenses are sequentially disposed with an air gap from an object side.

The third lens may have a convex image-side surface.

The fifth lens may have a concave image-side surface.

The sixth lens may have a convex image-side surface.

The seventh lens may have a shape in which an inflection point is formed on at least one of an object-side surface and an image-side surface.

At least one of the following conditional expressions may be satisfied, $-0.1<ImgHT/fG3<0.2$, $0.6<R1/ImgHT<0.7$, and $1.2<VG2/VG3<1.3$, where ImgHT is a height of an imaging plane, fG3 is a composited focal length of the fifth lens to the seventh lens, R1 is a radius of curvature of an object-side surface of the first lens, VG2 is an average of Abbe numbers of the second lens to the fourth lens, and VG3 is an average of Abbe numbers of the fifth lens to the seventh lens.

In another general aspect, an imaging lens system includes a first lens group, a second lens group, and a third lens group disposed on an optical axis in this order from an object side, wherein the first lens group and the second lens group are movable relative to each other in an optical axis direction between a wide-angle mode position and a telephoto mode position, wherein a field of view (FOV) is wider than 80 degrees.

A distance (TTL) from an object-side surface of a first lens of the first lens group to an imaging plane may be less than or equal to 7.5 mm.

The first lens group may include a first lens, the second lens group may include a second lens through a fourth lens, and the third lens group may include a fifth lens through a seventh lens disposed in this order.

A camera module may include the imaging lens system, and an image sensor having the imaging plane disposed in a position in which light incident through the first lens group to the third lens group is formed.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
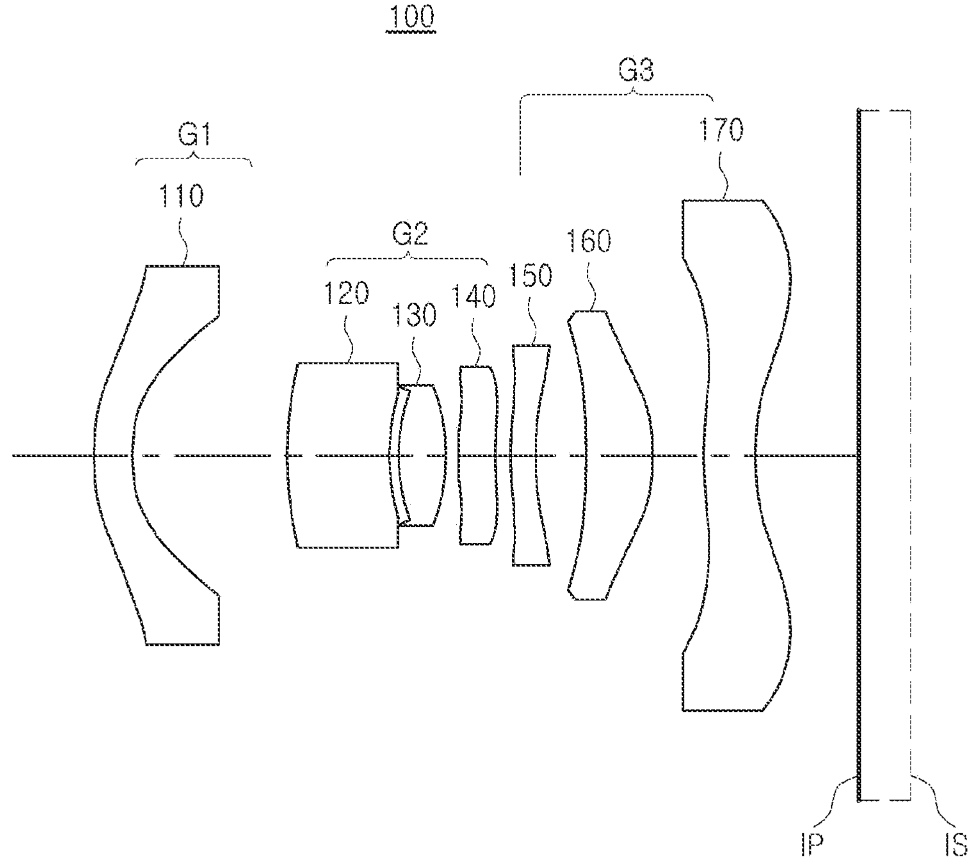
FIG. 1 is a block diagram of an imaging lens system according to a first embodiment of the present disclosure (wide-angle mode).

Hereinafter, while example embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide an imaging lens system that may be mounted in a portable electronic device and have high optical characteristics (e.g., focus magnification adjustment).

In the present specification, a first lens means a lens closest to an object (or a subject), and a seventh lens means a lens closest to an imaging plane (or an image sensor). In the present specification, a curvature of radius, a thickness, TTL (a distance from an object-side surface of the first lens to an imaging plane), 2ImgHT (a diagonal length of the imaging plane), ImgHT (½ of 2ImgHT), and a focal length of the lens may be represented in millimeters (mm).

The thickness of the lens, an interval between the lenses, and the TTL is a distance along an optical axis of the lens. In addition, in an explanation of a shape of each lens, a convex shape on one surface may mean that a paraxial region of the surface is convex, and a concave shape on one surface may mean that a paraxial region of the surface is concave. Therefore, even when one surface of the lens is described as having a convex shape, an edge (peripheral) portion of the lens may be concave. Similarly, even when one surface of the lens is described as having a concave shape, an edge (peripheral) portion of the lens may be convex.

The imaging lens system according to an embodiment of the present disclosure includes seven lenses. For example, the imaging lens system may include a first lens, a second lens, a third lens, a fourth lens, a fifth lens, a sixth lens, and a seventh lens, sequentially disposed from an object side.

The imaging lens system according to an embodiment may be configured to be mounted on a thinned portable terminal. For example, a distance (TTL) from an object-side surface of a forwardmost lens (or a first lens) of the imaging lens system to an imaging plane may be greater than 6.0 mm and less than 9.0 mm.

The imaging lens system according to an embodiment may be configured to have a generally wide field of view. For example, the field of view (FOV) of the imaging lens system may be wider than 85 degrees and narrower than 160 degrees.

The present disclosure may be configured in a form, different from the above-described embodiment.

For example, an imaging lens system according to a first embodiment includes a first lens, a second lens, a third lens, a fourth lens, a fifth lens, a sixth lens, and a seventh lens sequentially disposed from an object side. The imaging lens system according to the present embodiment includes a plurality of lenses having negative refractive power. For example, in the imaging lens system according to the present embodiment, the first lens, the second lens, and the seventh lens may have negative refractive power.

The imaging lens system according to the present embodiment may include a lens having a convex-side surface and a lens having a concave-side surface. For example, in the imaging lens system, the first lens may have a convex object-side surface, the fourth lens may have a concave image-side surface, and the sixth lens may have a concave object-side surface.

As another example, an imaging lens system according to a second embodiment may be configured to enable focus adjustment (AF) and focus magnification (Zoom). For example, the imaging lens system includes a first lens group, a second lens group, and a third lens group, sequentially disposed from an object side, and may be configured to enable focus adjustment and focus magnification through a change in positions of the first lens group and the second lens group.

The imaging lens system according to the present embodiment may have different sizes of focal lengths and fields of view. For example, the imaging lens system may have a field of view of narrower than 95 degrees. A focal length of the imaging lens system according to the former may be less than a focal length of the imaging lens system according to the latter.

In the imaging lens system according to the present embodiment, each lens group may include one or more lenses. For example, the first lens group may be configured to include one lens, the second lens group may be configured to include three lenses, and the third lens group may be configured to include three lenses.

In the imaging lens system, the first to third lens groups may have predetermined refractive power. For example, the third lens group may have negative refractive power, the second lens group may have positive refractive power, and the third lens group may have positive or negative refractive power.

The imaging lens system may change a field of view through movement of the first lens group and the second lens group. For example, the imaging lens system may implement a field of view of narrower than 95 degrees by moving the first lens group in a direction of the imaging plane, and moving the second lens group toward an object side. As another example, the imaging lens system may implement a field of view of wider than 120 degrees by moving the first lens group toward an object side, and moving the second lens group in a direction of the imaging plane.

As another example, the imaging lens system according to another embodiment includes a first lens, a second lens, a third lens, a fourth lens, a fifth lens, a sixth lens, and a seventh lens sequentially disposed from an object side. The imaging lens system according to the present embodiment can satisfy a specific conditional expression. For example, the imaging lens system may satisfy at least one of the following conditional expressions, $$25 < FOVw/fw < 60$$

$$15 < FOVw/TTLw < 25$$

$$2.0 < D12/D45 < 17$$

$$1.0 < TTLw/TTLt < 1.1$$

$$-0.1 < lmgHT/fG3$$

$$0.6R1/lmgHT < 0.7$$

$$1.2 < VG2/VG3 < 1.3$$

$$0.5 < d0S14/lmgHT < 0.85$$

$$0.9 < SagS14/T7 < 1.3$$

$$-0.7 < G1m/G2m < -0.4$$

Figure 17:
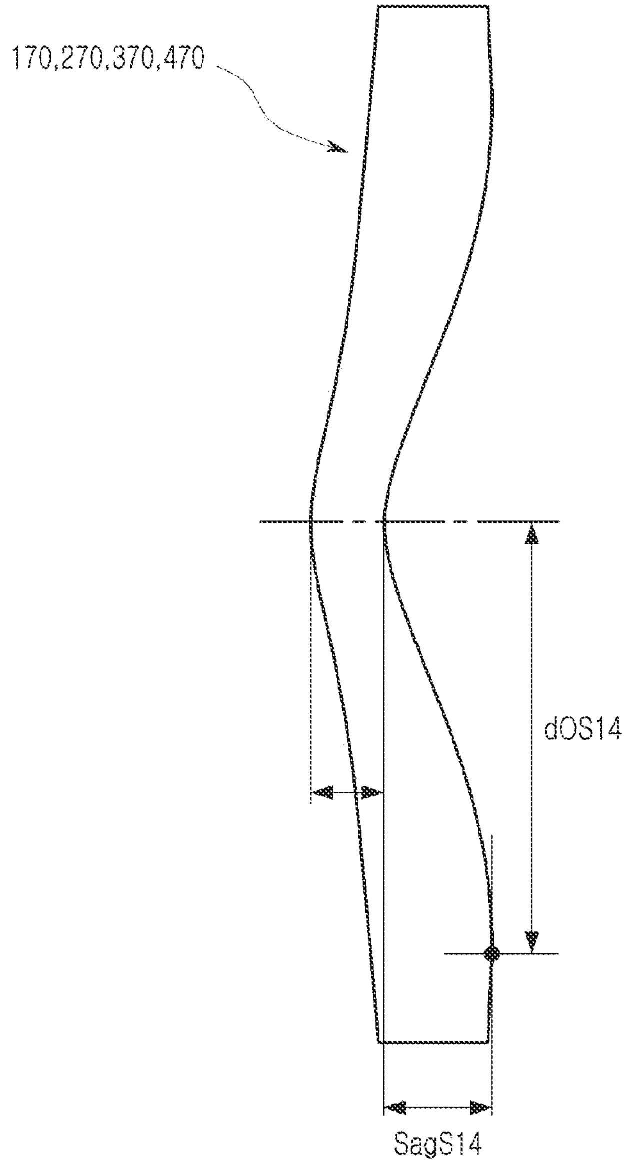
FIG. 17 is an enlarged view of a seventh lens according to an embodiment.

In the above conditional expressions, FOVw is a field of view in a wide-angle mode of the imaging lens system (for reference, FOVt is a field of view in a telephoto mode), fw is a focal length in a wide-angle mode of the imaging lens system, and ft is a focal length in a telephoto mode of the imaging lens system, D12 is a distance from an image-side surface of the first lens to an object-side surface of the second lens, D45 is a distance from an image-side surface of the fourth lens to an object-side surface of the fifth lens, TTLw is a TTL (a distance from an object-side surface of the first lens to an imaging plane) in a wide-angle mode of the imaging lens system, TTLt is a TTL (a distance from an object-side surface of the first lens to an imaging plane) in a telephoto mode of the imaging lens system, ImgHT is a height of the image plane, fG3 is a composited focal length of the fifth to seventh lenses, R1 is a radius of curvature of the object-side surface of the first lens, VG2 is an average of Abbe number of the second lens to the fourth lens, VG3 is an average of Abbe number of the fifth lens to the seventh lens, d0S14 is a distance from a point at which a first differential value with respect to an image-side surface of the seventh lens becomes 0 to an apex of the image-side surface of the seventh lens, SagS14 is a Sag value at a point at which a first differential value becomes 0 with respect to the image-side surface of the seventh lens, T7 is a thickness of the seventh lens in a center of an optical axis, G1m is a distance in which the first lens group is moved when changing from a wide-angle mode to a telephoto mode, G2m is a distance in which the second lens group is moved when changing from a wide-angle mode to a telephoto mode. For reference, T7, d0S14, and SagS14 may refer to portions illustrated in FIG. 17.

The imaging lens system may satisfy at least one of the following conditional expressions, $$R1/ImgHT < 0.90$$

$$0.7 < SagS14/T7 < 1.8$$

The imaging lens system may include one or more lenses having the following characteristics, if necessary. For example, the imaging lens system according to an embodiment may include at least one of the first to seventh lenses according to the following features. As another example, the imaging lens system according to another embodiment may include two or more of the first to seventh lenses according to the following features. However, the imaging lens system according to an embodiment or another embodiment of the present disclosure does not necessarily include a lens according to the following features.

Hereinafter, characteristics of first to seventh lenses will be described.

The first lens has refractive power. For example, the first lens may have negative refractive power. One surface of the first lens may be convex. For example, the first lens may have a convex object-side surface. The first lens includes a spherical surface or an aspherical surface. For example, both surfaces of the first lens may be spherical. As another example, at least one surface of the first lens may be aspherical. The first lens may be formed of a material having high light transmittance and excellent workability. For example, the first lens may be formed of a plastic material or a glass material. The first lens may be configured to have a high refractive index. For example, the refractive index of the first lens may be greater than 1.7. As another example, the refractive index of the first lens may be greater than 1.70 and less than 1.90. The first lens may have a predetermined Abbe number. For example, the Abbe number of the first lens may be less than 40. As another example, the Abbe number of the first lens may be greater than 20 and less than 40.

The second lens has refractive power. For example, the second lens may have negative refractive power. One surface of the second lens may be convex. For example, the second lens may have a convex object-side surface. The second lens includes a spherical surface or an aspherical surface. For example, both surfaces of the second lens may be spherical. As another example, at least one surface of the second lens may be aspherical. The second lens may be formed of a material having high light transmittance and excellent workability. For example, the second lens may be formed of a plastic material or a glass material. The second lens may be configured to have a greater refractive index than the first lens. For example, the refractive index of the second lens may be greater than 1.9. For example, the refractive index of the second lens may be greater than 1.9. As another example, the refractive index of the second lens may be greater than 1.90 and less than 2.0. The second lens may have a predetermined Abbe number. For example, the Abbe number of the second lens may be less than 20. As another example, the Abbe number of the second lens may be greater than 10 and less than 20.

The third lens has refractive power. For example, the third lens may have positive refractive power. One surface of the third lens may be convex. For example, the third lens may have a convex image-side surface. The third lens includes a spherical surface or an aspherical surface. For example, both surfaces of the third lens may be spherical. As another example, at least one surface of the third lens may be aspherical. The third lens may be formed of a material having high light transmittance and excellent workability. For example, the third lens may be formed of a plastic material. The third lens may be configured to have a lower refractive index than the first lens. For example, the refractive index of the third lens may be greater than 1.6. As another example, the refractive index of the third lens may be greater than 1.5 and lower than 1.6. The third lens may have a predetermined Abbe number. For example, the Abbe number of the third lens may be greater than 50. As another example, the Abbe number of the third lens may be greater than 50 and lower than 70.

The fourth lens has refractive power. For example, the fourth lens may have positive refractive power. One surface of the fourth lens may be convex. For example, the fourth lens may have a convex object-side surface. The fourth lens includes a spherical surface or an aspherical surface. For example, both surfaces of the fourth lens may be spherical. As another example, at least one surface of the fourth lens may be aspherical. The fourth lens may be formed of a material having high light transmittance and excellent workability. For example, the fourth lens may be formed of a plastic material. The fourth lens may be configured to have a lower refractive index than the first lens. For example, the refractive index of the third lens may be lower than 1.6. As another example, the refractive index of the third lens may be greater than 1.5 and lower than 1.6. The fourth lens may have a predetermined Abbe number. For example, the Abbe number of the fourth lens may be greater than 50. As another example, the Abbe number of the fourth lens may be greater than 50 and lower than 70.

The fifth lens has refractive power. For example, the fifth lens may have negative refractive power. One surface of the fifth lens may be convex. For example, the fifth lens may have a convex object-side surface. The fifth lens includes a spherical surface or an aspherical surface. For example, both surfaces of the fifth lens may be spherical. As another example, at least one surface of the fifth lens may be aspherical. The fifth lens may be formed of a material having high light transmittance and excellent workability. For example, the fifth lens may be formed of a plastic material.

The fifth lens may be configured to have a greater refractive index than the third lens. For example, the refractive index of the fifth lens may be greater than 1.6. As another example, the refractive index of the fifth lens may be greater than 1.6 and lower than 1.7. The fifth lens may have a predetermined Abbe number. For example, the Abbe number of the fifth lens may be greater than 20. As another example, the Abbe number of the fifth lens may be greater than 20 and lower than 30.

The sixth lens has refractive power. For example, the sixth lens may have positive refractive power. One surface of the sixth lens may be convex. For example, the sixth lens may have a convex image-side surface. The sixth lens includes a spherical surface or an aspherical surface. For example, both surfaces of the sixth lens may be spherical. As another example, at least one surface of the sixth lens may be aspherical. The sixth lens may be formed of a material having high light transmittance and excellent workability. For example, the sixth lens may be formed of a plastic material. The sixth lens may be configured to have a predetermined refractive index. For example, the refractive index of the sixth lens may be lower than 1.6. As another example, the refractive index of the sixth lens may be greater than 1.5 and lower than 1.6. The sixth lens may have a predetermined Abbe number. For example, the Abbe number of the sixth lens may be greater than 50. As another example, the Abbe number of the sixth lens may be greater than 50 and lower than 70.

The seventh lens has refractive power. For example, the seventh lens may have negative refractive power. One surface of the seventh lens may be convex. For example, the seventh lens may have a convex object-side surface. The seventh lens includes a spherical surface or an aspherical surface. For example, both surfaces of the seventh lens may be spherical. As another example, at least one surface of the seventh lens may be spherical or aspherical. The seventh lens may be formed of a material having high light transmittance and excellent workability. For example, the seventh lens may be formed of a plastic material. The seventh lens may be configured to have a greater refractive index than the third lens. For example, the refractive index of the seventh lens may be greater than 1.6. As another example, the refractive index of the seventh lens may be greater than 1.6 and lower than 1.7. The seventh lens may have a predetermined Abbe number. For example, the Abbe number of the seventh lens may be greater than 20. As another example, the Abbe number of the seventh lens may be greater than 20 and lower than 30. The seventh lens may include a unique shape. For example, the seventh lens may be configured such that a shape of a central portion on an optical axis is different from a shape of a peripheral portion. For example, the object-side surface of the seventh lens may be convex in a central portion on an optical axis and may be concave in a peripheral portion. As another example, the image-side surface of the seventh lens may be concave in a central portion on an optical axis and may be convex in a peripheral portion. In addition, the seventh lens may have a shape in which an inflection point is formed on at least one of the object-side surface and the image-side surface thereof.

The first to seventh lenses may include a spherical surface or an aspherical surface as described above. When the first to seventh lenses include an aspherical surface, the aspherical surface of the corresponding lens may be expressed by Equation 1 below.

$$Z = \frac{cr^2}{1+\sqrt{1-(2+k)c^2r^2}} + a_0r^4 + a_1r^6 + a_2r^8 + a_3r^{10} + a_4r^{12} + a_5r^{14} + a_6r^{16} + a_7r^{18} + \ldots \quad \text{Equation 1}$$

In Equation 1, c is a reciprocal of a radius of curvature of the lens, k is a conical constant, r is a distance from any point on an aspherical surface to an optical axis, $a_0$ to $a_7$ are aspherical surface constants, and Z (or SAG) is a height in an optical axis direction from any point on an aspherical surface to an apex of the aspherical surface.

The imaging lens system according to the above-described embodiment or the above-described form may further include a stop and a filter. For example, the imaging lens system may further include a stop disposed on the second lens and the third lens or a stop included in the second lens group. As another example, the imaging lens system may further include a filter disposed between a rearmost lens (the seventh lens or the third lens group) and the imaging plane. The stop may be configured to adjust an amount of light incident in a direction of the imaging plane, and the filter may block light of a specific wavelength. For reference, the filter described herein is configured to block infrared rays, but light of a wavelength that is blocked through the filter is not limited to infrared rays.

Hereinafter, an imaging lens system according to a specific embodiment will be described with reference to the drawings.

Figure 2:
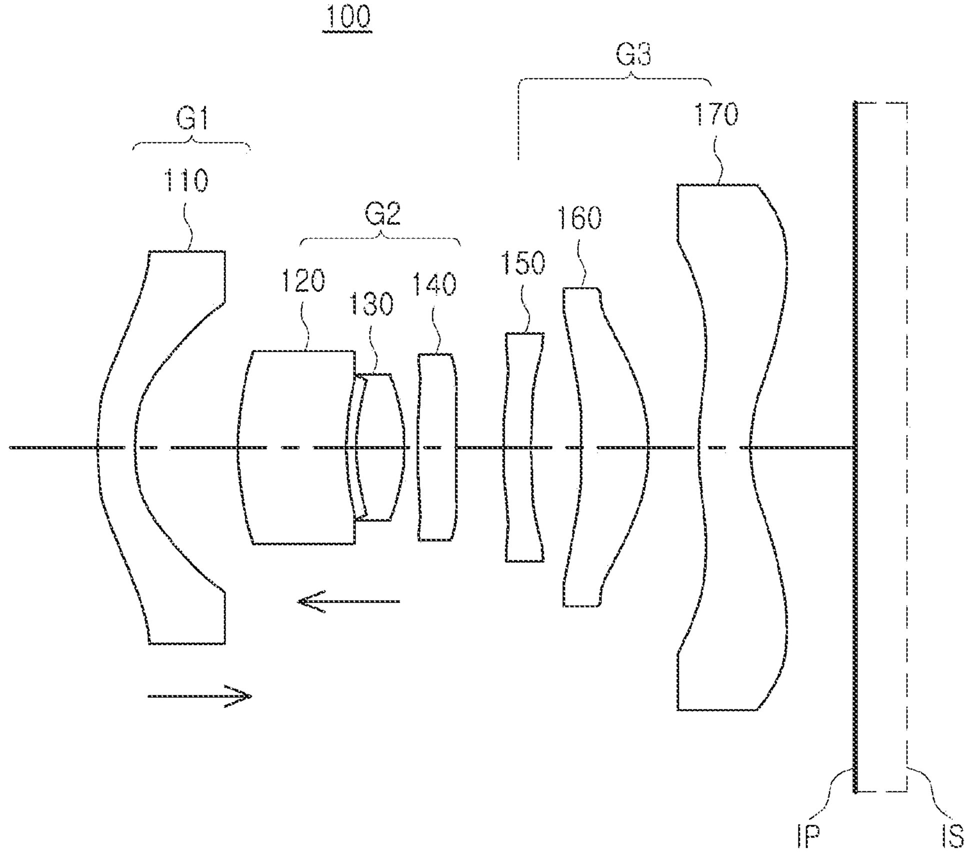
FIG. 2 is a block diagram of an imaging lens system according to a first embodiment of the present disclosure (telephoto mode).

First, an imaging lens system according to a first embodiment will be described with reference to FIGS. 1 and 2.

An imaging lens system 100 includes a first lens 110, a second lens 120, a third lens 130, a fourth lens 140, a fifth lens 150, a sixth lens 160, and a seventh lens 170.

The first lens 110 has negative refractive power, and has a convex object-side surface and a concave image-side surface. The second lens 120 has negative refractive power, and has a convex object-side surface and a concave image-side surface. The third lens 130 has positive refractive power, and has a convex object-side surface and a convex image-side surface. The fourth lens 140 has positive refractive power, and has a convex object-side surface and a concave image-side surface. The fifth lens 150 has negative refractive power, and has a convex object-side surface and a concave image-side surface. The sixth lens 160 has positive refractive power, and has a concave object-side surface and a convex image-side surface. The seventh lens 170 has negative refractive power, and has a convex object-side surface and a concave image-side surface. In addition, the seventh lens 170 may have a shape in which an inflection point is formed on at least one of the object-side surface and the image-side surface thereof. In detail, the object-side surface of the seventh lens 170 may be convex in a central portion on an optical axis and concave in a peripheral portion. In addition, the image-side surface of the seventh lens 170 may be concave in a central portion on an optical axis and convex in a peripheral portion.

The first lens 110 to the seventh lens 170 may be divided into a plurality of lens groups. For example, the first lens 110 may constitute a first lens group G1, the second lens 120 to the fourth lens 140 may constitute a second lens group G2, and the fifth lens 150 to the seventh lens 170 may constitute a third lens group G3.

At least one of the first lens 110 to the seventh lens 170 in the imaging lens system 100 may be configured to be movable in an optical axis direction. For example, the lenses

110, 120, 130, and 140 constituting the first lens group G1 and the second lens group G2 may be configured to be moved in an optical axis direction.

The imaging lens system 100 may be configured to enable focus adjustment (AF) and focus magnification adjustment (Zoom). For example, the imaging lens system 100 may perform focus adjustment by slightly moving at least one of the first lens group G1 and the second lens group G2 in an optical axis direction. As another example, the imaging lens system 100 may enable focus magnification adjustment by moving both the first lens group G1 and the second lens group G2 in an optical axis direction. For reference, the third lens group G3 may not move when the focus adjustment (AF) and focus magnification adjustment (Zoom) of the imaging lens system 100 are performed, but may be moved by a fairly insignificant amount for resolution of the imaging lens system 100.

The imaging lens system 100 may further include a stop and a filter (not illustrated), and an imaging plane IP. For example, the stop may be disposed between the second lens 120 and the third lens 130, and the filter may be disposed between the seventh lens 170 and the imaging plane IP. However, the imaging lens system 100 does not necessarily include the stop and the filter. For example, the stop or the filter may be omitted if necessary. The imaging plane IP may be disposed in a position in which light incident through the first lens 110 to the seventh lens 170 is formed. For example, the imaging plane IP may be formed on one surface of the image sensor IS of a camera module or on an optical element disposed inside the image sensor IS.

The imaging lens system 100 according to the present embodiment may implement two imaging modes. For example, the imaging lens system 100 may implement a first imaging mode (or a wide-angle mode) through a form illustrated in FIG. 1. As another example, the imaging lens system 100 may implement a second imaging mode (or a telephoto mode) through a form illustrated in FIG. 2. A change from the first imaging mode to the second imaging mode and a change from the second imaging mode to the first imaging mode may be performed by changing positions of the first lens group G1 and the second lens group G2. For example, the imaging lens system 100 according to a second imaging mode may be implemented by changing the first lens group G1 in a direction of the imaging plane, and changing the second lens group G2 to an object side, in the imaging lens system 100 according to a first imaging mode. As another example, the imaging lens system 100 according to a first imaging mode may be implemented by moving the first lens group G1 to an object side, and moving the second lens group G2 in a direction of the imaging plane, in the imaging lens system 100 according to a second imaging mode.

Next, characteristics according to each imaging mode will be described.

The imaging lens system 100 according to the first imaging mode may have a field of view of 120 degrees or more. For example, the imaging lens system 100 according to the first imaging mode may have a field of view of 140 degrees. The imaging lens system 100 according to the first imaging mode may generally image a subject located at a relatively short distance compared to the second imaging mode.

The imaging lens system 100 may perform focus adjustment in a state of the first imaging mode. For example, the imaging lens system 100 may perform focus adjustment by slightly moving at least one of the first lens group G1 and the second lens group G2 in an optical axis direction.

The imaging lens system 100 according to the second imaging mode may have a field of view of narrower than 95 degrees. For example, the imaging lens system 100 according to the second imaging mode may have a field of view of 90 degrees. The imaging lens system 100 according to the second imaging mode may generally image a subject located at a relatively long distance compared to the first imaging mode.

The imaging lens system 100 may perform focus adjustment in a state of the second imaging mode. For example, the imaging lens system 100 may perform focus adjustment by slightly moving at least one of the first lens group G1 and the second lens group G2 in an optical axis direction.

Figure 3:
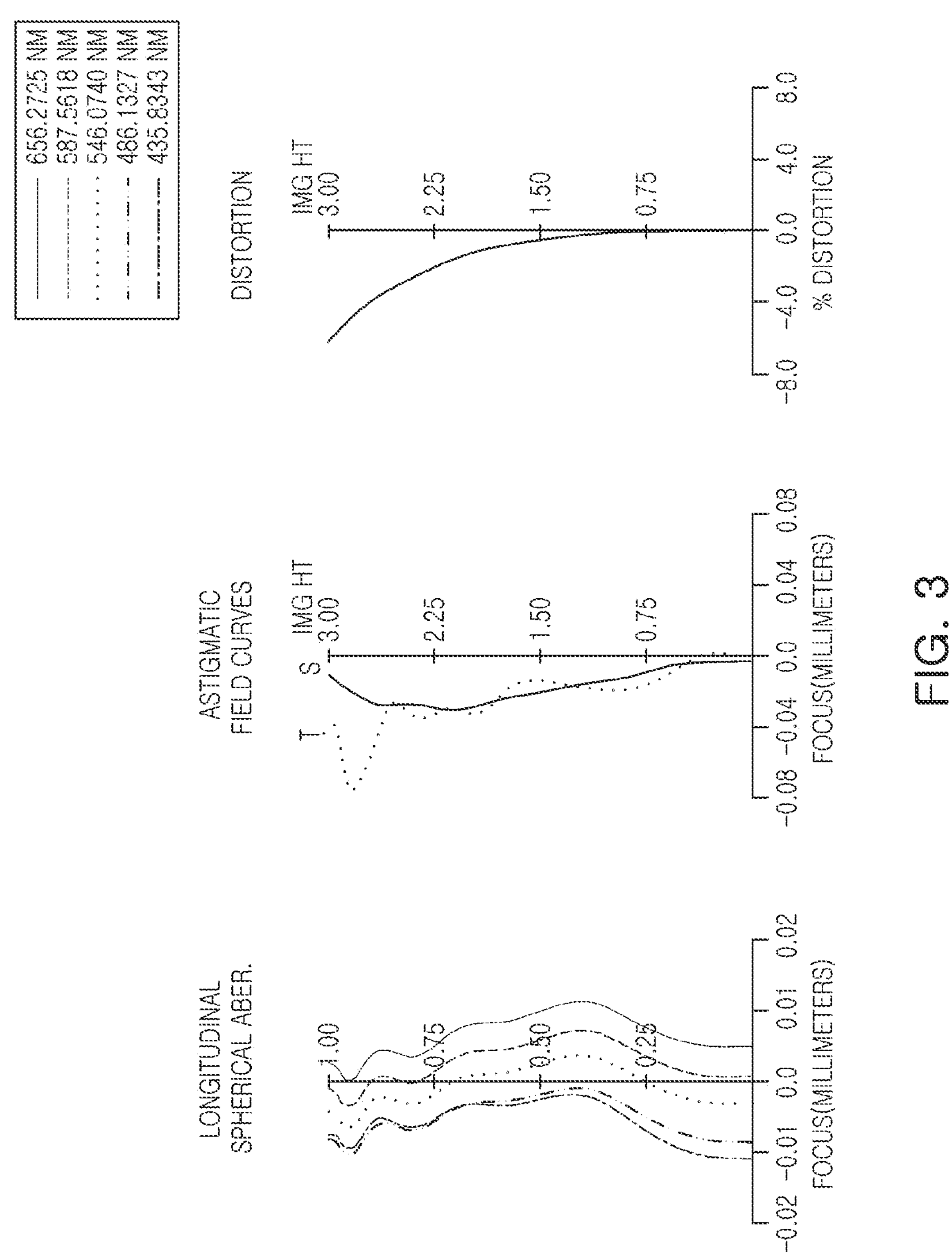
FIG. 3 is an aberration curve of the imaging lens system illustrated in FIG. 1.
Figure 4:
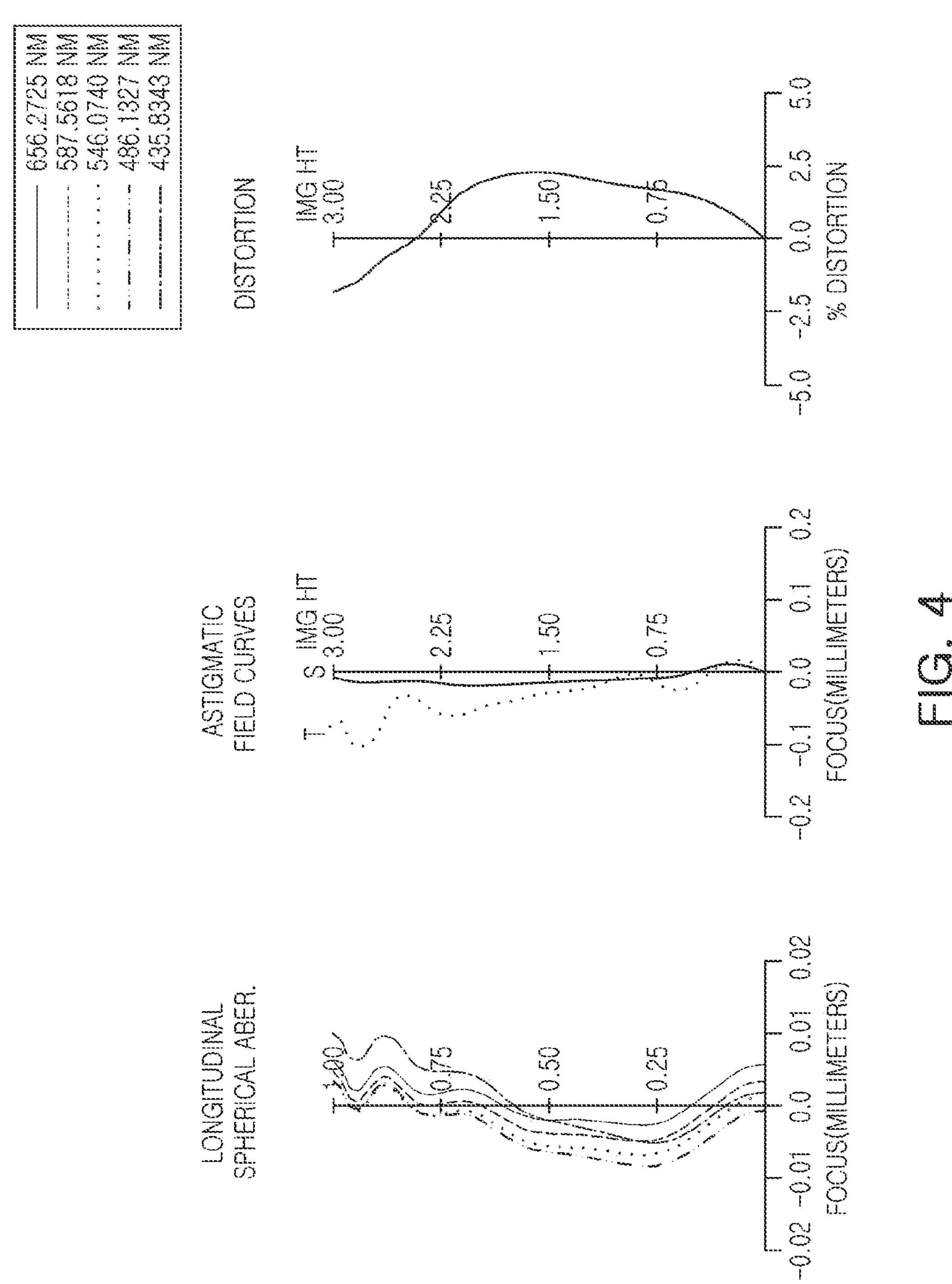
FIG. 4 is an aberration curve of the imaging lens system illustrated in FIG. 2.

The imaging lens system 100 configured as above exhibits different aberration characteristics as illustrated in FIGS. 3 and 4. Tables 1 to 3 illustrate lens characteristics and aspheric values of the imaging lens system according to the present embodiment.

TABLE 1

| Surface No. | Reference | Radius of curvature | Thickness/ distance | Refractive index | Abbe number | Focal length |
|---|---|---|---|---|---|---|
| S1 | First lens | 2.05508 | 0.34765 | 1.7486 | 35.50 | −4.125 |
| S2 | | 1.14459 | d1 | | | |
| S3 | Second lens | 3.50743 | 1.00000 | 1.9460 | 17.90 | −24.171 |
| S4 | | 2.61949 | 0.09435 | | | |
| S5 | Third lens | 2.15412 | 0.44376 | 1.5350 | 55.70 | 2.165 |
| S6 | | −2.32655 | 0.13981 | | | |
| S7 | Fourth lens | 4.22636 | 0.35421 | 1.5350 | 55.70 | 23.985 |
| S8 | | 6.11796 | d2 | | | |
| S9 | Fifth lens | 3.71295 | 0.25000 | 1.6349 | 24.00 | −24.484 |
| S10 | | 2.91876 | 0.49187 | | | |
| S11 | Sixth lens | −4.07751 | 0.63624 | 1.5350 | 55.70 | 3.670 |
| S12 | | −1.39739 | 0.48444 | | | |
| S13 | Seventh lens | 2.90261 | 0.47002 | 1.6349 | 24.00 | −3.314 |
| S14 | | 1.14319 | d3 | | | |
| S15 | Imaging plane | infinity | d4 | | | |

TABLE 2

| Reference | Wide-angle mode | Telephoto mode |
|---|---|---|
| d1 | 1.496 | 1.016 |
| d2 | 0.140 | 0.449 |
| d3 | 1.007 | 1.011 |
| d4 | 0.003 | −0.001 |

TABLE 3

| Reference | S14 |
|---|---|
| rN | 2.5 |
| k | −5.41196900 |
| $a_0$ | −0.91614790 |
| $a_1$ | 0.05641624 |
| $a_2$ | −0.02468798 |
| $a_3$ | 0.00485717 |
| $a_4$ | −0.00257955 |
| $a_5$ | −0.00226835 |
| $a_6$ | 0.00082354 |
| $a_7$ | −0.00044497 |
| $a_8$ | −0.00004581 |
| $a_9$ | −0.00062966 |
| $a_{10}$ | 0.00010120 |
| $a_{11}$ | 0.00002514 |
| $a_{12}$ | 0.00004806 |
| $a_{13}$ | −0.00005081 |

In Table 3, rN refers to an effective diameter of the seventh lens.

Figure 5:
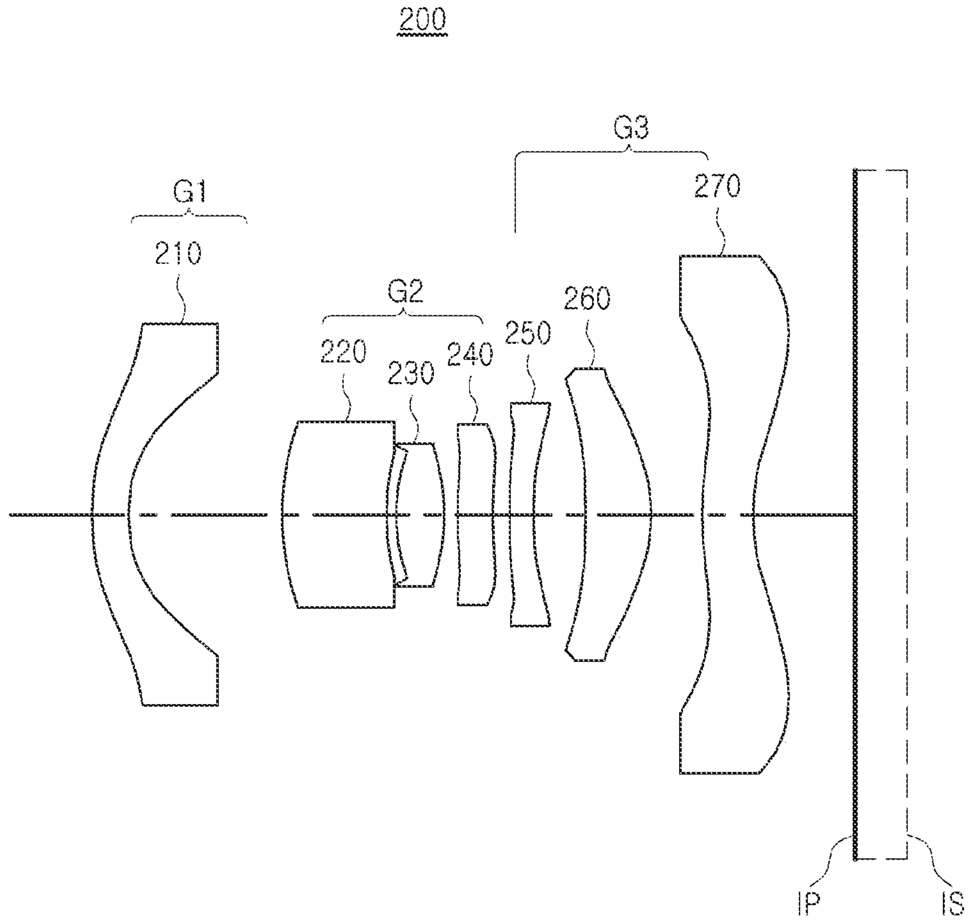
FIG. 5 is a block diagram of an imaging lens system according to a second embodiment of the present disclosure (wide-angle mode).
Figure 6:
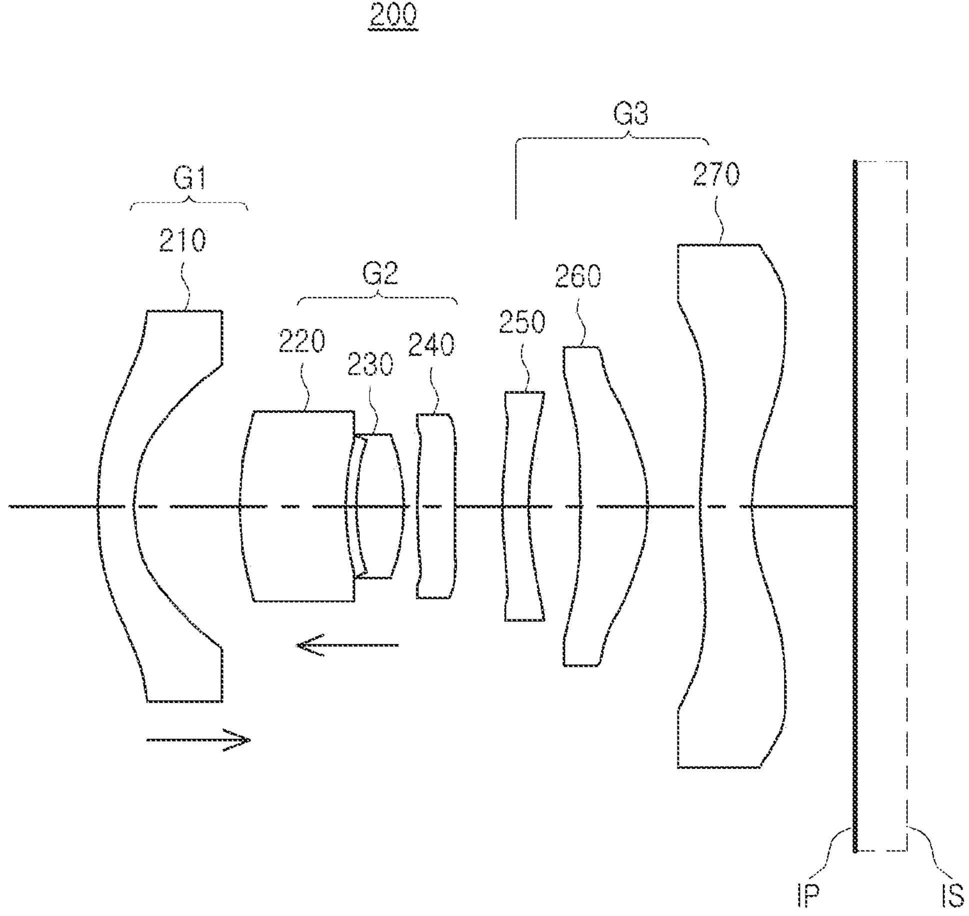
FIG. 6 is a block diagram of an imaging lens system according to a second embodiment of the present disclosure (telephoto mode).

An imaging lens system according to a second embodiment will be described with reference to FIGS. 5 and 6.

An imaging lens system 200 includes a first lens 210, a second lens 220, a third lens 230, a fourth lens 240, a fifth lens 250, a sixth lens 260, and a seventh lens 270.

The first lens 210 has negative refractive power, and has a convex object-side surface and a concave image-side surface. The second lens 220 has negative refractive power, and has a convex object-side surface and a concave image-side surface. The third lens 230 has positive refractive power, and has a convex object-side surface and a convex image-side surface. The fourth lens 240 has positive refractive power, and has a convex object-side surface and a concave image-side surface. The fifth lens 250 has negative refractive power, and has a convex object-side surface and a concave image-side surface. The sixth lens 260 has positive refractive power, and has a concave object-side surface and a convex image-side surface. The seventh lens 270 has negative refractive power, and has a convex object-side surface and a concave image-side surface. In addition, the seventh lens 270 may have a shape in which an inflection point is formed on at least one of the object-side surface and the image-side surface thereof. In detail, the object-side surface of the seventh lens 270 may be convex in a central portion on an optical axis and concave in a peripheral portion. In addition, the image-side surface of the seventh lens 270 may be concave in a central portion on an optical axis and convex in a peripheral portion.

The first lens 210 to the seventh lens 270 may be divided into a plurality of lens groups. For example, the first lens 210 may constitute a first lens group G1, the second lens 220 to the fourth lens 240 may constitute a second lens group G2, and the fifth lens 250 to the seventh lens 270 may constitute a third lens group G3.

At least one of the first lens 210 to the seventh lens 270 in the imaging lens system 200 may be configured to be movable in an optical axis direction. For example, the lenses 210, 220, 230, and 240 constituting the first lens group G1 and the second lens group G2 may be configured to be moved in an optical axis direction.

The imaging lens system 200 may be configured to enable focus adjustment (AF) and focus magnification adjustment (Zoom). For example, the imaging lens system 200 may perform focus adjustment by slightly moving at least one of the first lens group G1 and the second lens group G2 in an optical axis direction. As another example, the imaging lens system 200 may enable focus magnification adjustment by moving both the first lens group G1 and the second lens group G2 in an optical axis direction. For reference, the third lens group G3 may not move when the focus adjustment (AF) and focus magnification adjustment (Zoom) of the imaging lens system 200 are performed, but may be moved by a fairly insignificant amount for resolution of the imaging lens system 200.

The imaging lens system 200 may further include a stop and a filter (not illustrated), and an imaging plane IP. For example, the stop may be disposed between the second lens 220 and the third lens 230, and the filter may be disposed between the seventh lens 270 and the imaging plane IP. However, the imaging lens system 200 does not necessarily include the stop and the filter. For example, the stop or the filter may be omitted if necessary. The imaging plane IP may be disposed at a position at which light incident through the first lens 210 to the seventh lens 270 is formed. For example, the imaging plane IP may be formed on one surface of the image sensor IS of the camera module or on an optical element disposed inside the image sensor IS.

The imaging lens system 200 according to the present embodiment may implement two imaging modes. For example, the imaging lens system 200 may implement a first imaging mode (or a wide-angle mode) through a form illustrated in FIG. 5. As another example, the imaging lens system 200 may implement a second imaging mode (or a telephoto mode) through a form illustrated in FIG. 6. A change from the first imaging mode to the second imaging mode and a change from the second imaging mode to the first imaging mode may be performed by changing positions of the first lens group G1 and the second lens group G2. For example, the imaging lens system 200 according to a second imaging mode may be implemented by changing the first lens group G1 in a direction of the imaging plane, and changing the second lens group G2 to an object side, in the imaging lens system 200 according to a first imaging mode. As another example, the imaging lens system 200 according to a first imaging mode may be implemented by moving the first lens group G1 to an object side, and moving the second lens group G2 in a direction of the imaging plane, in the imaging lens system 200 according to a second imaging mode.

Next, characteristics according to each imaging mode will be described.

The imaging lens system 200 according to the first imaging mode may have a field of view of 120 degrees or more. For example, the imaging lens system 200 according to the first imaging mode may have a field of view of 140 degrees. The imaging lens system 200 according to the first imaging mode may generally image a subject located at a relatively short distance compared to the second imaging mode.

The imaging lens system 200 may perform focus adjustment in a state of the first imaging mode. For example, the imaging lens system 200 may perform focus adjustment by slightly moving at least one of the first lens group G1 and the second lens group G2 in an optical axis direction.

The imaging lens system 200 according to the second imaging mode may have a field of view of narrower than 95 degrees. For example, the imaging lens system 200 according to the second imaging mode may have a field of view of 90 degrees. The imaging lens system 200 according to the second imaging mode may generally image a subject located at a relatively long distance compared to the first imaging mode.

The imaging lens system 200 may perform focus adjustment in a state of the second imaging mode. For example, the imaging lens system 200 may perform focus adjustment by slightly moving at least one of the first lens group G1 and the second lens group G2 in an optical axis direction.

Figure 7:
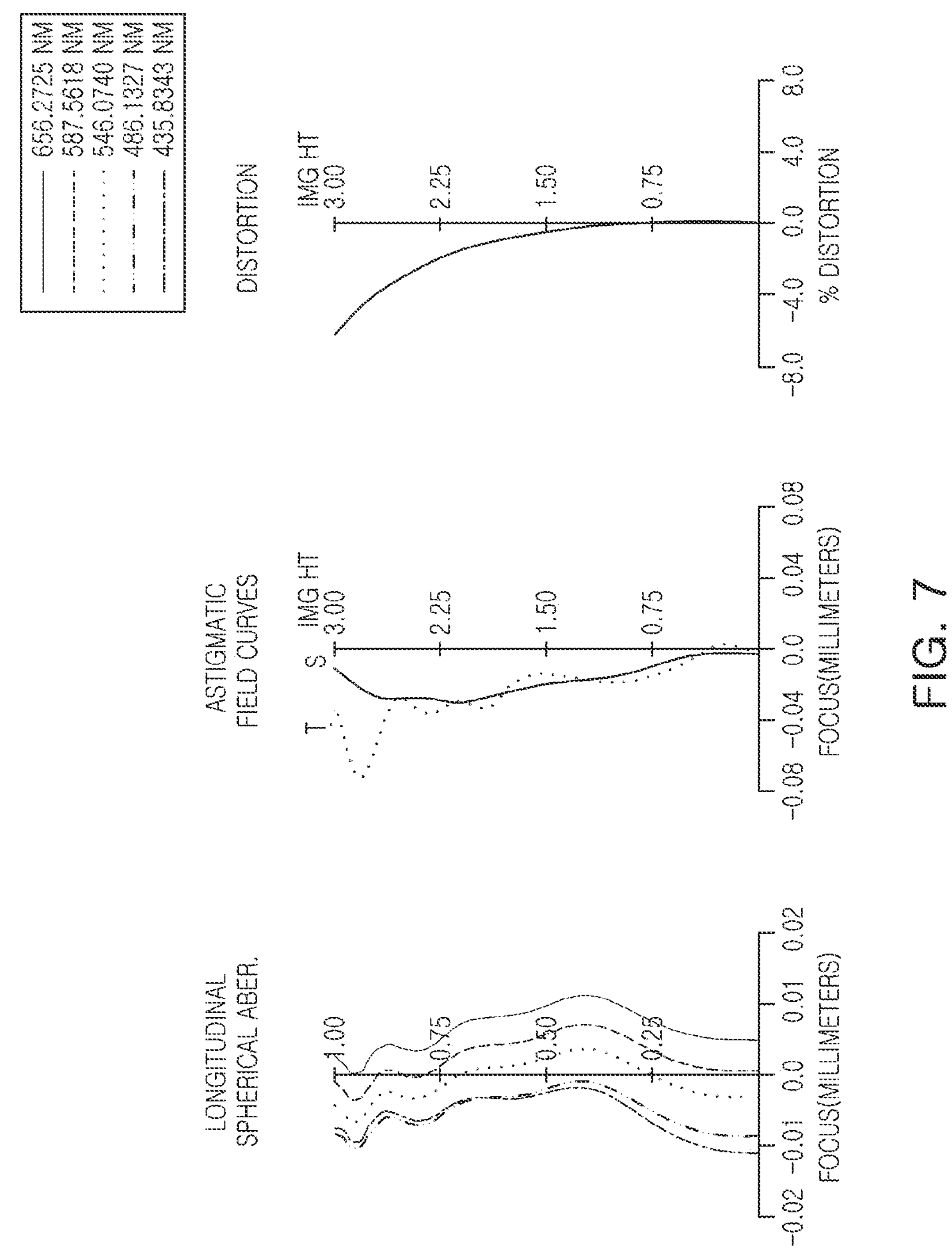
FIG. 7 is an aberration curve of the imaging lens system illustrated in FIG. 5.
Figure 8:
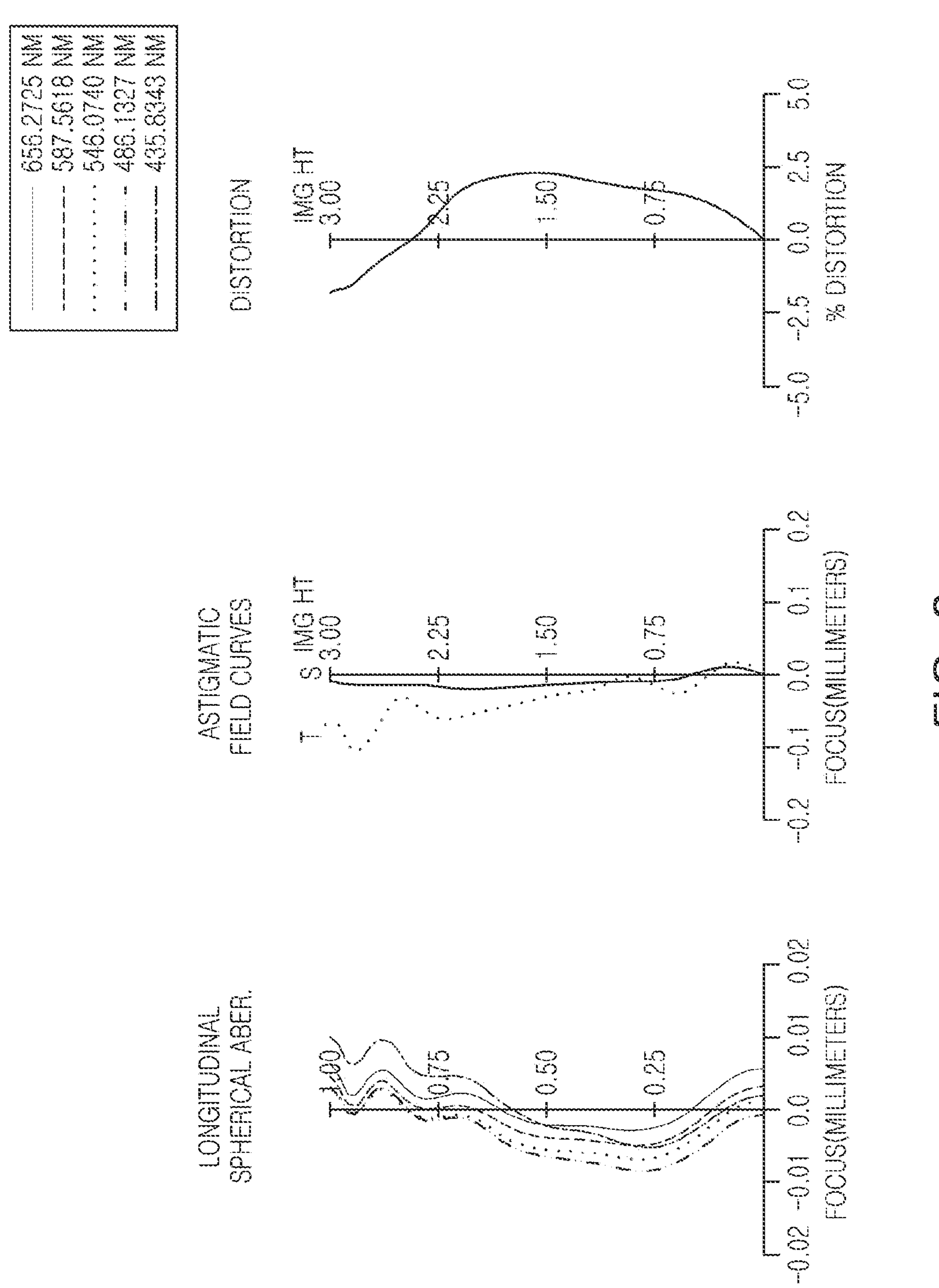
FIG. 8 is an aberration curve of the imaging lens system illustrated in FIG. 6.

The imaging lens system 200 configured as above exhibits different aberration characteristics as illustrated in FIGS. 7 and 8. Tables 4 to 6 illustrate lens characteristics and aspheric values of the imaging lens system according to the present embodiment.

TABLE 4

| Surface No. | Reference | Radius of curvature | Thickness/ distance | Refractive index | Abbe number | Focal length |
|---|---|---|---|---|---|---|
| S1 | First lens | 1.90046 | 0.44156 | 1.8820 | 37.20 | −4.299 |
| S2 | | 1.12811 | d1 | | | |
| S3 | Second lens | 3.46152 | 0.98499 | 1.9460 | 17.90 | −41.352 |
| S4 | | 2.74022 | 0.10056 | | | |
| S5 | Third lens | 2.22879 | 0.46014 | 1.5163 | 64.10 | 2.358 |
| S6 | | −2.49521 | 0.17782 | | | |
| S7 | Fourth lens | 3.72653 | 0.36005 | 1.5350 | 55.70 | 18.076 |
| S8 | | 5.85870 | d2 | | | |
| S9 | Fifth lens | 3.79552 | 0.25000 | 1.6349 | 24.00 | −40.635 |
| S10 | | 3.22414 | 0.61341 | | | |
| S11 | Sixth lens | −2.09413 | 0.52787 | 1.5891 | 61.20 | 3.027 |
| S12 | | −1.05314 | 0.25450 | | | |
| S13 | Seventh lens | 2.13898 | 0.45058 | 1.6349 | 24.00 | −3.296 |
| S14 | | 0.97131 | d3 | | | |
| S15 | Imaging plane | infinity | d4 | | | |

TABLE 5

| Reference | Wide-angle mode | Telephoto mode |
|---|---|---|
| d1 | 1.496 | 1.016 |
| d2 | 0.134 | 0.433 |
| d3 | 1.200 | 1.203 |
| d4 | 0.003 | 0.000 |

TABLE 6

| Reference | S14 |
|---|---|
| rN | 2.6 |
| k | −4.80696300 |
| $a_0$ | −0.64638130 |
| $a_1$ | 0.06077927 |
| $a_2$ | −0.01451804 |
| $a_3$ | −0.00030858 |
| $a_4$ | −0.00020951 |
| $a_5$ | −0.00092674 |
| $a_6$ | 0.00070064 |
| $a_7$ | −0.00052021 |
| $a_8$ | 0.00030858 |
| $a_9$ | −0.00034696 |
| $a_{10}$ | 0.00004433 |
| $a_{11}$ | 0.00002100 |
| $a_{12}$ | 0.00007339 |
| $a_{13}$ | −0.00003449 |

In Table 6, rN refers to an effective diameter of the seventh lens.

Figure 9:
FIG. 9 is a block diagram of an imaging lens system according to a third embodiment of the present disclosure (wide-angle mode).
Figure 9:
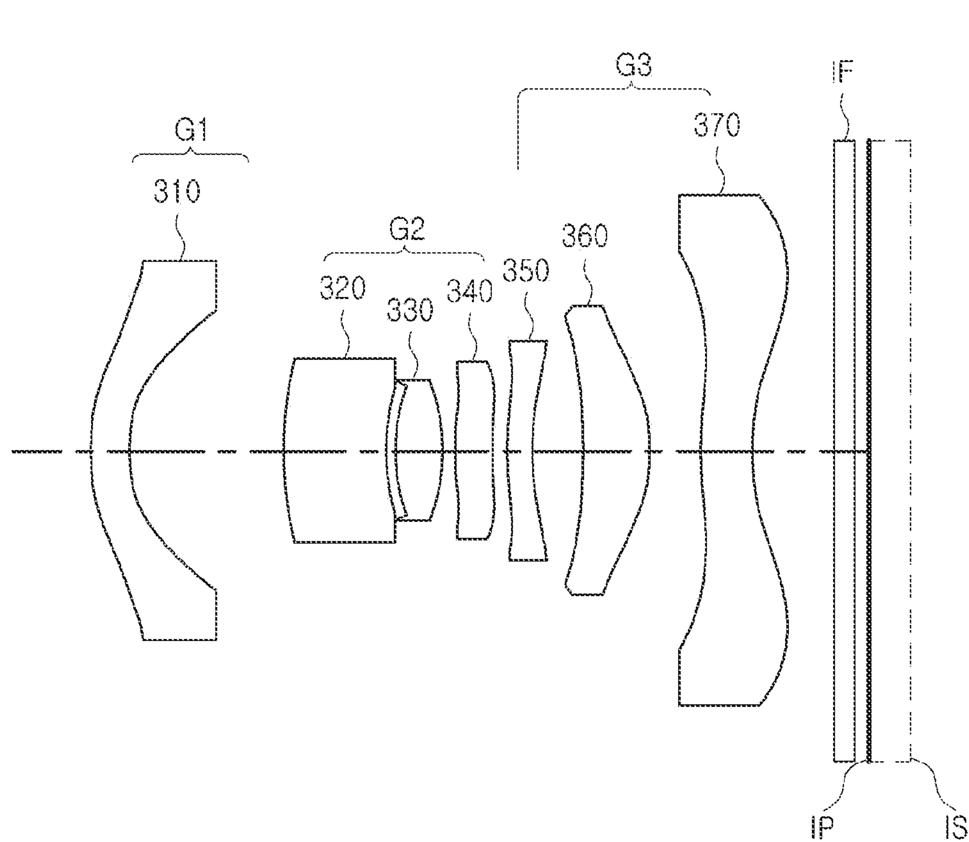
Figure 10:
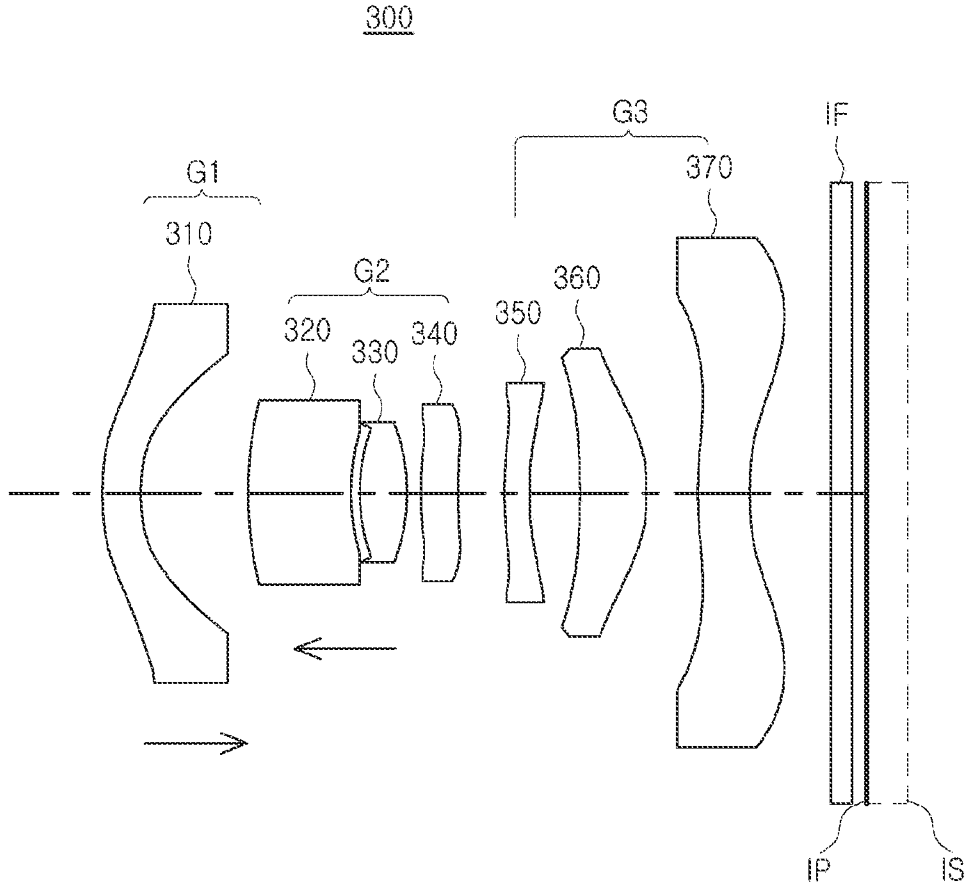
FIG. 10 is a block diagram of an imaging lens system according to a third embodiment of the present disclosure (telephoto mode).

An imaging lens system according to a third embodiment will be described with reference to FIGS. 9 and 10.

An imaging lens system 300 includes a first lens 310, a second lens 320, a third lens 330, a fourth lens 340, a fifth lens 350, a sixth lens 360, and a seventh lens 370.

The first lens 310 has negative refractive power, and has a convex object-side surface and a concave image-side surface. The second lens 320 has negative refractive power, and has a convex object-side surface and a concave image-side surface. The third lens 330 has positive refractive power, and has a convex object-side surface and a convex image-side surface. The fourth lens 340 has positive refractive power, and has a convex object-side surface and a concave image-side surface. The fifth lens 350 has negative refractive power, and has a convex object-side surface and a concave image-side surface. The sixth lens 360 has positive refractive power, and has a concave object-side surface and a convex image-side surface. The seventh lens 370 has negative refractive power, and has a convex object-side surface and a concave image-side surface. In addition, the seventh lens 370 may have a shape in which an inflection point is formed on at least one of the object-side surface and the image-side surface thereof. In detail, the object-side surface of the seventh lens 370 may be convex in a central portion on an optical axis and concave in a peripheral portion. In addition, the image-side surface of the seventh lens 370 may be concave in a central portion on an optical axis and convex in a peripheral portion.

The first lens 310 to the seventh lens 370 may be divided into a plurality of lens groups. For example, the first lens 310 may constitute a first lens group G1, the second lens 320 to the fourth lens 340 may constitute a second lens group G2, and the fifth lens 350 to the seventh lens 370 may constitute a third lens group G3.

At least one of the first lens 310 to the seventh lens 370 in the imaging lens system 300 may be configured to be movable in an optical axis direction. For example, the lenses 310, 320, 330, and 340 constituting the first lens group G1 and the second lens group G2 may be configured to be moved in an optical axis direction.

The imaging lens system 300 may be configured to enable focus adjustment (AF) and focus magnification adjustment (Zoom). For example, the imaging lens system 300 may perform focus adjustment by slightly moving at least one of the first lens group G1 and the second lens group G2 in an optical axis direction. As another example, the imaging lens system 300 may enable focus magnification adjustment by moving both the first lens group G1 and the second lens group G2 in an optical axis direction. For reference, the third lens group G3 may not move when the focus adjustment (AF) and focus magnification adjustment (Zoom) of the imaging lens system 300 are performed, but may be moved by a fairly insignificant amount for resolution of the imaging lens system 300.

The imaging lens system 300 may further include a stop and a filter (not illustrated), and an imaging plane IP. For example, the stop may be disposed between the second lens 320 and the third lens 330, and the filter may be disposed between the seventh lens 370 and the imaging plane IP. However, the imaging lens system 300 does not necessarily include the stop and the filter. For example, the stop or the filter may be omitted if necessary. The imaging plane IP may be formed at a position at which light incident through the first lens 310 to the seventh lens 370 is formed. For example, the imaging plane IP may be formed on one surface of the image sensor IS of the camera module or on an optical element disposed inside the image sensor IS.

The imaging lens system 300 according to the present embodiment may implement two imaging modes. For example, the imaging lens system 300 may implement a first imaging mode (or a wide-angle mode) through a form illustrated in FIG. 9. As another example, the imaging lens system 300 may implement a second imaging mode (or a telephoto mode) through a form illustrated in FIG. 10. A change from the first imaging mode to the second imaging mode and a change from the second imaging mode to the first imaging mode may be performed by changing positions of the first lens group G1 and the second lens group G2. For example, the imaging lens system 300 according to a second imaging mode may be implemented by changing the first lens group G1 in a direction of the imaging plane, and changing the second lens group G2 to an object side, in the imaging lens system 300 according to a first imaging mode. As another example, the imaging lens system 300 according to a first imaging mode may be implemented by moving the first lens group G1 to an object side, and moving the second lens group G2 in a direction of the imaging plane, in the imaging lens system 300 according to a second imaging mode.

Next, characteristics according to each imaging mode will be described.

The imaging lens system 300 according to the first imaging mode may have a field of view of 120 degrees or more. For example, the imaging lens system 300 according to the first imaging mode may have a field of view of 140 degrees. The imaging lens system 300 according to the first imaging mode may generally image a subject located at a relatively short distance compared to the second imaging mode.

The imaging lens system 300 may perform focus adjustment in a state of the first imaging mode. For example, the imaging lens system 300 may perform focus adjustment by slightly moving at least one of the first lens group G1 and the second lens group G2 in an optical axis direction.

The imaging lens system 300 according to the second imaging mode may have a field of view of narrower than 95 degrees. For example, the imaging lens system 300 according to the second imaging mode may have a field of view of 90 degrees. The imaging lens system 300 according to the second imaging mode may generally image a subject located at a relatively long distance compared to the first imaging mode.

The imaging lens system 300 may perform focus adjustment in a state of the second imaging mode. For example, the imaging lens system 300 may perform focus adjustment by slightly moving at least one of the first lens group G1 and the second lens group G2 in an optical axis direction.

Figure 11:
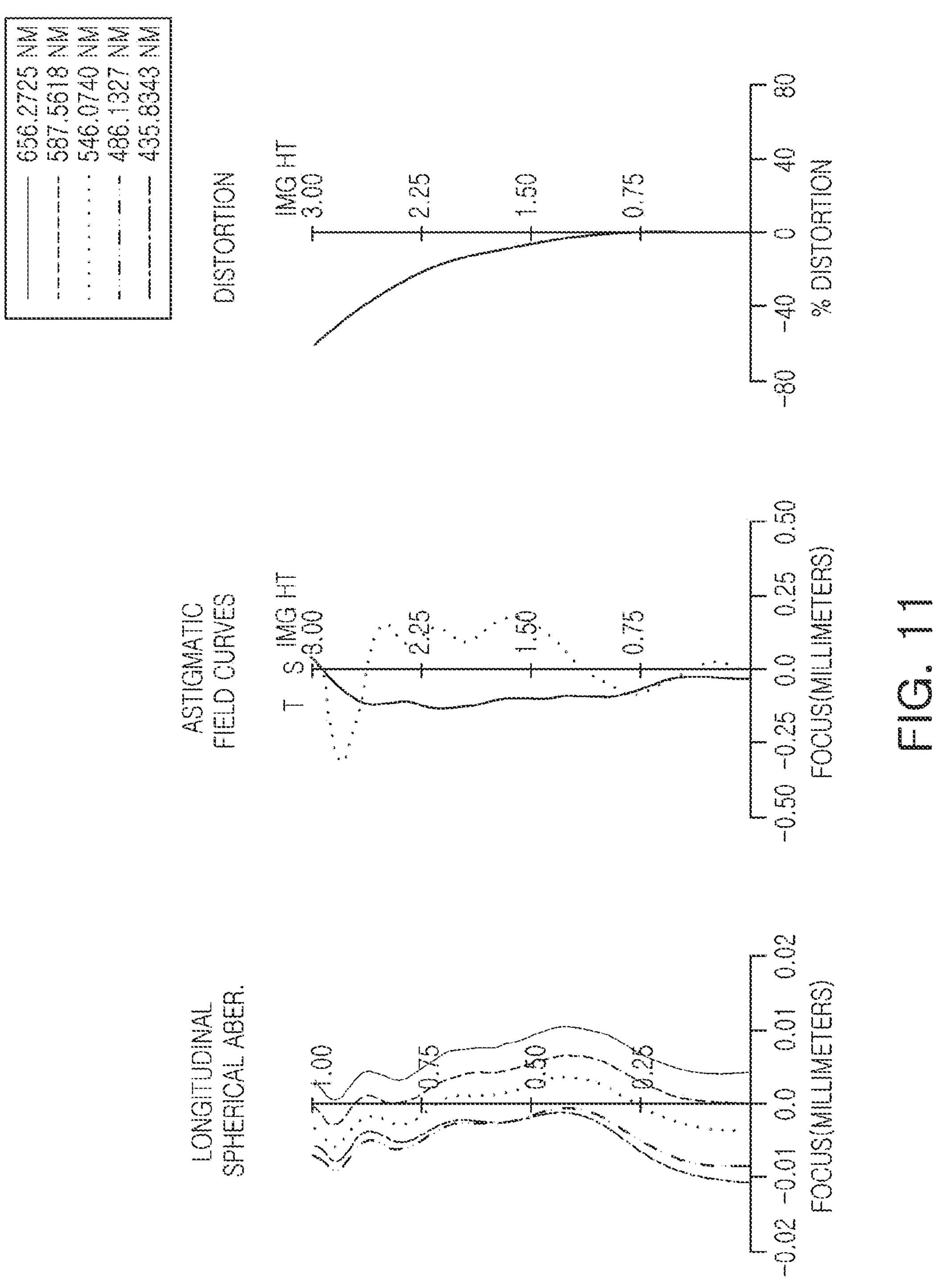
FIG. 11 is an aberration curve of the imaging lens system illustrated in FIG. 9.
Figure 12:
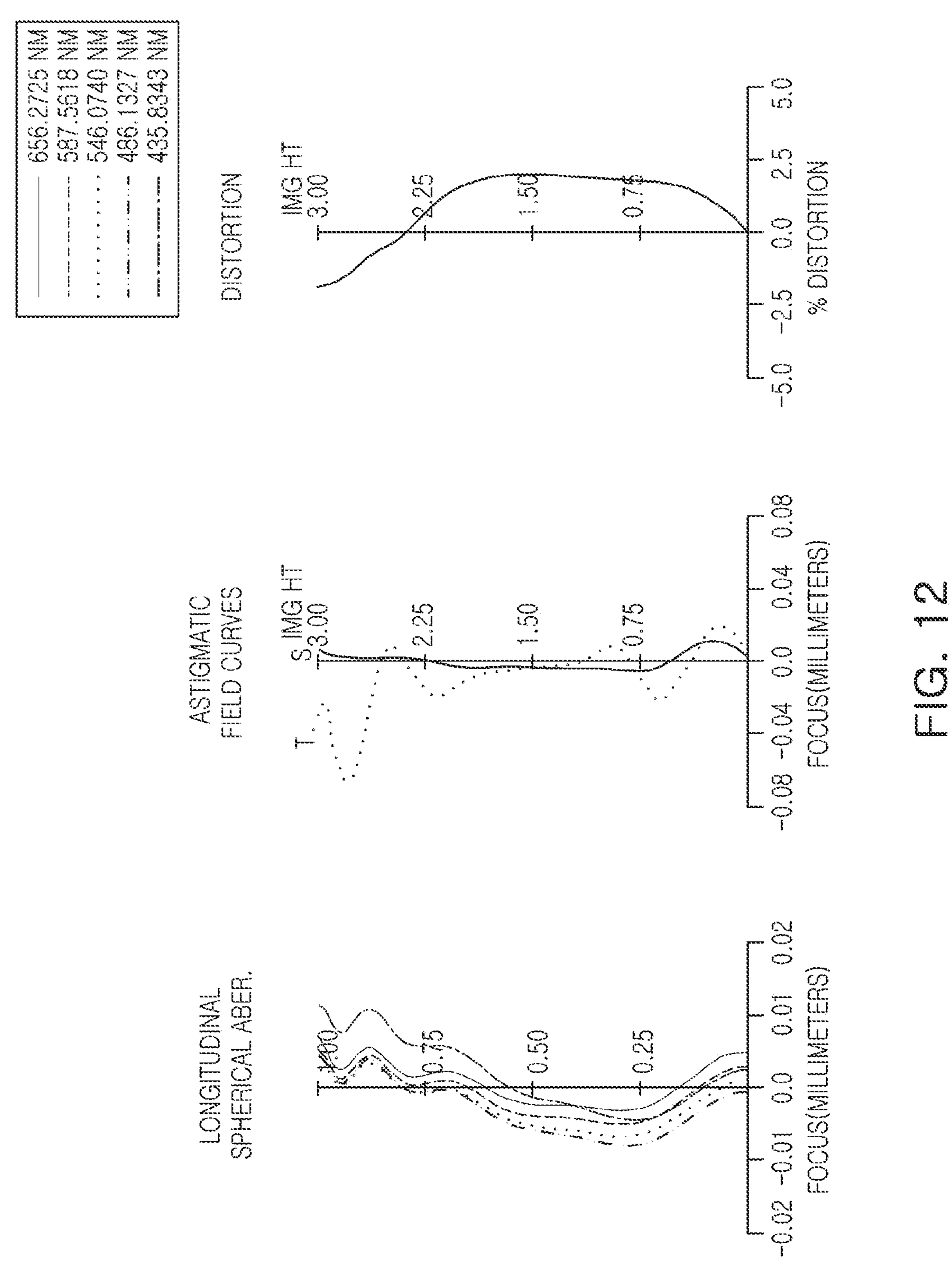
FIG. 12 is an aberration curve of the imaging lens system illustrated in FIG. 10.

The imaging lens system 300 configured as above exhibits different aberration characteristics as illustrated in FIGS. 11 and 12. Tables 7 to 9 illustrate lens characteristics and aspheric values of the imaging lens system according to the present embodiment.

TABLE 7

| Surface No. | Reference | Radius of curvature | Thickness/ distance | Refractive index | Abbe number | Focal length |
|---|---|---|---|---|---|---|
| S1 | First lens | 2.58242 | 0.35000 | 1.882 | 37.20 | −3.960 |
| S2 | | 1.39039 | d1 | | | |
| S3 | Second lens | 2.90989 | 0.87342 | 1.946 | 17.90 | −166.654 |
| S4 | | 2.44026 | 0.10002 | | | |
| S5 | Third lens | 2.12693 | 0.44605 | 1.516 | 64.10 | 2.587 |
| S6 | | −3.33500 | 0.16467 | | | |
| S7 | Fourth lens | 2.94234 | 0.35000 | 1.535 | 55.70 | 10.497 |
| S8 | | 5.92425 | d2 | | | |
| S9 | Fifth lens | 3.77397 | 0.25000 | 1.635 | 24.00 | −15.441 |
| S10 | | 2.65490 | 0.64015 | | | |
| S11 | Sixth lens | −2.54165 | 0.53165 | 1.589 | 61.20 | 2.689 |
| S12 | | −1.05153 | 0.32742 | | | |
| S13 | Seventh lens | 1.78450 | 0.35000 | 1.635 | 24.00 | −2.985 |
| S14 | | 0.84916 | d3 | | | |
| S15 | Imaging plane | infinity | d4 | | | |

TABLE 8

| Reference | Wide-angle mode | Telephoto mode |
|---|---|---|
| d1 | 1.609 | 1.109 |
| d2 | 0.100 | 0.444 |
| d3 | 1.236 | 1.236 |
| d4 | 0.000 | 0.000 |

TABLE 9

| Reference | S14 |
|---|---|
| rN | 2.64 |
| k | −4.509207 |
| $a_0$ | −0.682174 |
| $a_1$ | 0.086037 |
| $a_2$ | −0.012292 |
| $a_3$ | 0.001200 |
| $a_4$ | −0.001471 |
| $a_5$ | −0.001563 |
| $a_6$ | 0.000393 |
| $a_7$ | −0.000603 |
| $a_8$ | 0.000400 |
| $a_9$ | −0.000223 |
| $a_{10}$ | 0.000088 |
| $a_{11}$ | 0.000001 |
| $a_{12}$ | 0.000061 |
| $a_{13}$ | −0.000032 |

In Table 9, rN refers to an effective diameter of the seventh lens.

Figure 13:
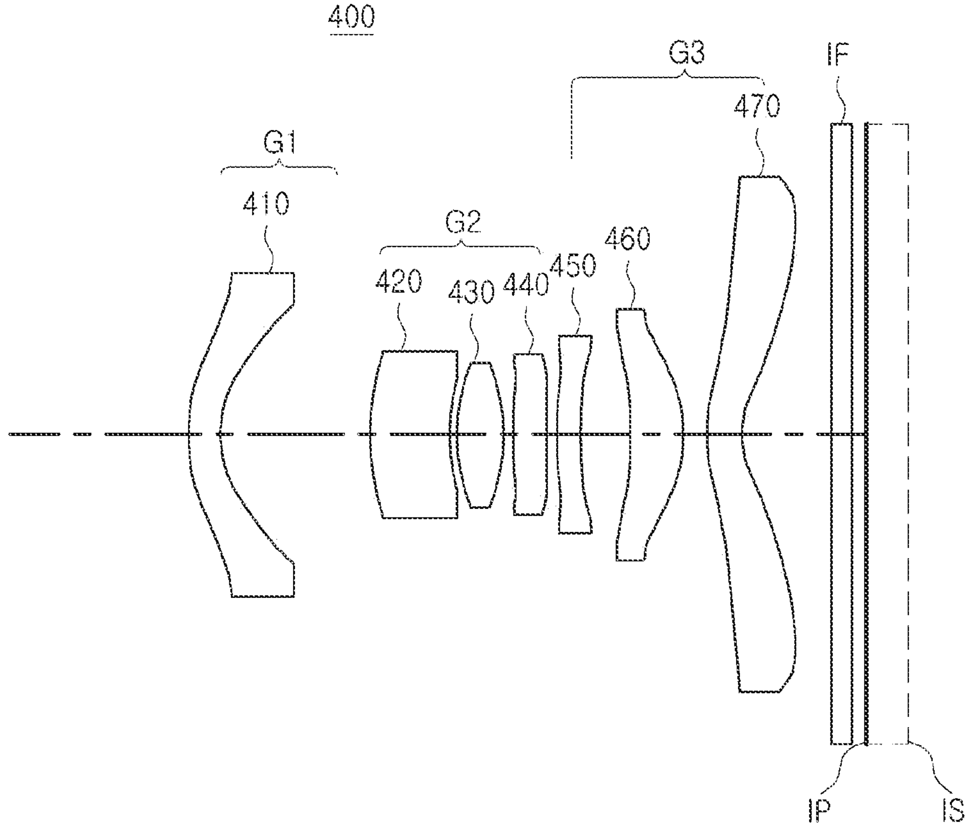
FIG. 13 is a block diagram of an imaging lens system according to a fourth embodiment of the present disclosure (wide-angle mode).
Figure 14:
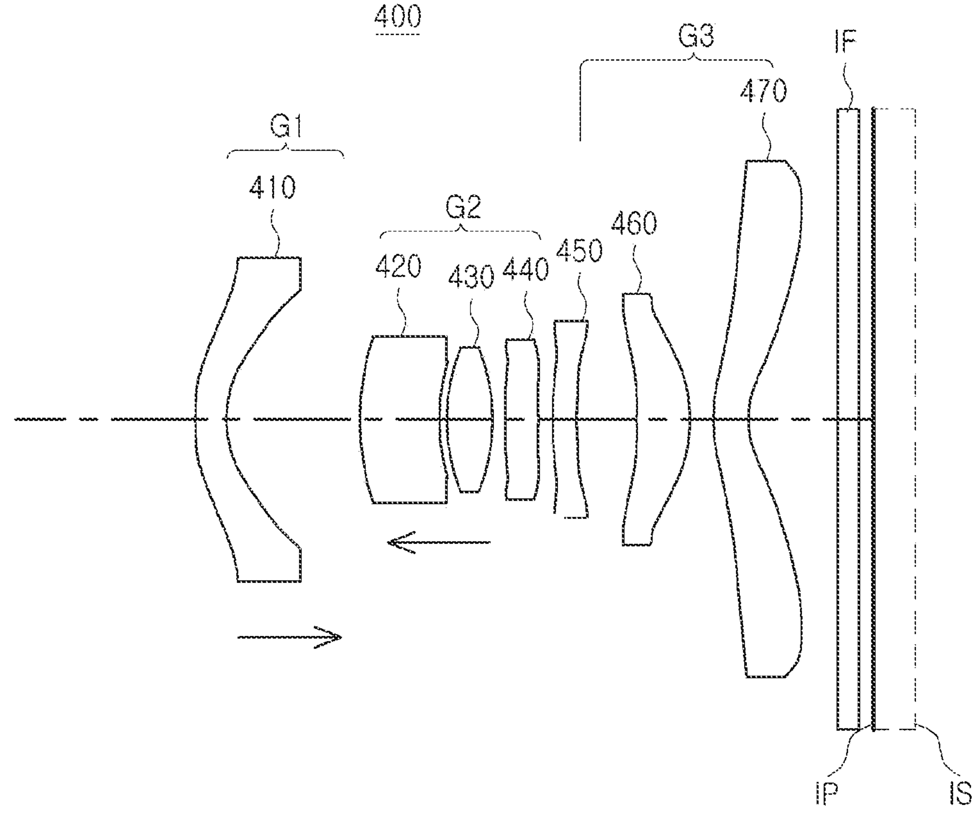
FIG. 14 is a block diagram of an imaging lens system according to a fourth embodiment of the present disclosure (telephoto mode).

An imaging lens system according to a fourth embodiment will be described with reference to FIGS. 13 and 14.

An imaging lens system 400 includes a first lens 410, a second lens 420, a third lens 430, a fourth lens 440, a fifth lens 450, a sixth lens 460, and a seventh lens 470.

The first lens 410 has negative refractive power, and has a convex object-side surface and a concave image-side surface. The second lens 420 has negative refractive power, and has a convex object-side surface and a concave image-side surface. The third lens 430 has positive refractive power, and has a convex object-side surface and a convex image-side surface. The fourth lens 440 has positive refractive power, and has a convex object-side surface and a concave image-side surface. The fifth lens 450 has negative refractive power, and has a convex object-side surface and a concave image-side surface. The sixth lens 460 has positive refractive power, and has a concave object-side surface and a convex image-side surface. The seventh lens 470 has negative refractive power, and has a convex object-side surface and a concave image-side surface. In addition, the seventh lens 470 may have a shape in which an inflection point is formed on at least one of the object-side surface and the image-side surface thereof. In detail, the object-side surface of the seventh lens 470 may be convex in a central portion on an optical axis and concave in a peripheral portion. In addition, the image-side surface of the seventh lens 470 may be concave in a central portion on an optical axis and convex in a peripheral portion.

The first lens 410 to the seventh lens 470 may be divided into a plurality of lens groups. For example, the first lens 410 may constitute a first lens group G1, the second lens 420 to the fourth lens 440 may constitute a second lens group G2, and the fifth lens 450 to the seventh lens 470 may constitute a third lens group G3.

At least one of the first lens 410 to the seventh lens 470 in the imaging lens system 400 may be configured to be movable in an optical axis direction. For example, the lenses 410, 420, 430, and 440 constituting the first lens group G1 and the second lens group G2 may be configured to be moved in an optical axis direction.

The imaging lens system 400 may be configured to enable focus adjustment (AF) and focus magnification adjustment (Zoom). For example, the imaging lens system 400 may perform focus adjustment by slightly moving at least one of the first lens group G1 and the second lens group G2 in an optical axis direction. As another example, the imaging lens system 400 may enable focus magnification adjustment by moving both the first lens group G1 and the second lens group G2 in an optical axis direction. For reference, the third lens group G3 may not move when the focus adjustment (AF) and focus magnification adjustment (Zoom) of the imaging lens system 400 are performed, but may be moved by a fairly insignificant amount for resolution of the imaging lens system 400.

The imaging lens system 400 may further include a stop (not illustrated), a filter IF, and an imaging plane IP. For example, the stop may be disposed between the second lens 420 and the third lens 430, and the filter IF may be disposed between the seventh lens 470 and the imaging plane IP. However, the imaging lens system 400 does not necessarily include the stop and the filter IF. For example, the stop or the filter IF may be omitted if necessary. The imaging plane IP may be disposed at a position at which light incident through the first lens 410 to the seventh lens 470 is formed. For example, the imaging plane IP may be formed on one surface of the image sensor IS of the camera module or on an optical element disposed inside the image sensor IS.

The imaging lens system 400 according to the present embodiment may implement two imaging modes. For example, the imaging lens system 400 may implement a first imaging mode (or a wide-angle mode) through a form illustrated in FIG. 13. As another example, the imaging lens system 400 may implement a second imaging mode (or a telephoto mode) through a form illustrated in FIG. 14. A change from the first imaging mode to the second imaging mode and a change from the second imaging mode to the first imaging mode may be performed by changing positions of the first lens group G1 and the second lens group G2. For example, the imaging lens system 400 according to a second imaging mode may be implemented by changing the first lens group G1 in a direction of the imaging plane, and changing the second lens group G2 to an object side, in the imaging lens system 400 according to a first imaging mode. As another example, the imaging lens system 400 according to a first imaging mode may be implemented by moving the first lens group G1 to an object side, and moving the second lens group G2 in a direction of the imaging plane, in the imaging lens system 400 according to a second imaging mode.

Next, characteristics according to each imaging mode will be described.

The imaging lens system 400 according to the first imaging mode may have a field of view of 120 degrees or more. For example, the imaging lens system 400 according to the first imaging mode may have a field of view of 140 degrees. The imaging lens system 400 according to the first imaging mode may generally image a subject located at a relatively short distance compared to the second imaging mode.

The imaging lens system 400 may perform focus adjustment in a state of the first imaging mode. For example, the imaging lens system 400 may perform focus adjustment by slightly moving at least one of the first lens group G1 and the second lens group G2 in an optical axis direction.

The imaging lens system 400 according to the second imaging mode may have a field of view of narrower than 95 degrees. For example, the imaging lens system 400 according to the second imaging mode may have a field of view of 90 degrees. The imaging lens system 400 according to the second imaging mode may generally image a subject located at a relatively long distance compared to the first imaging mode.

The imaging lens system 400 may perform focus adjustment in a state of the second imaging mode. For example, the imaging lens system 400 may perform focus adjustment by slightly moving at least one of the first lens group G1 and the second lens group G2 in an optical axis direction.

Figure 15:
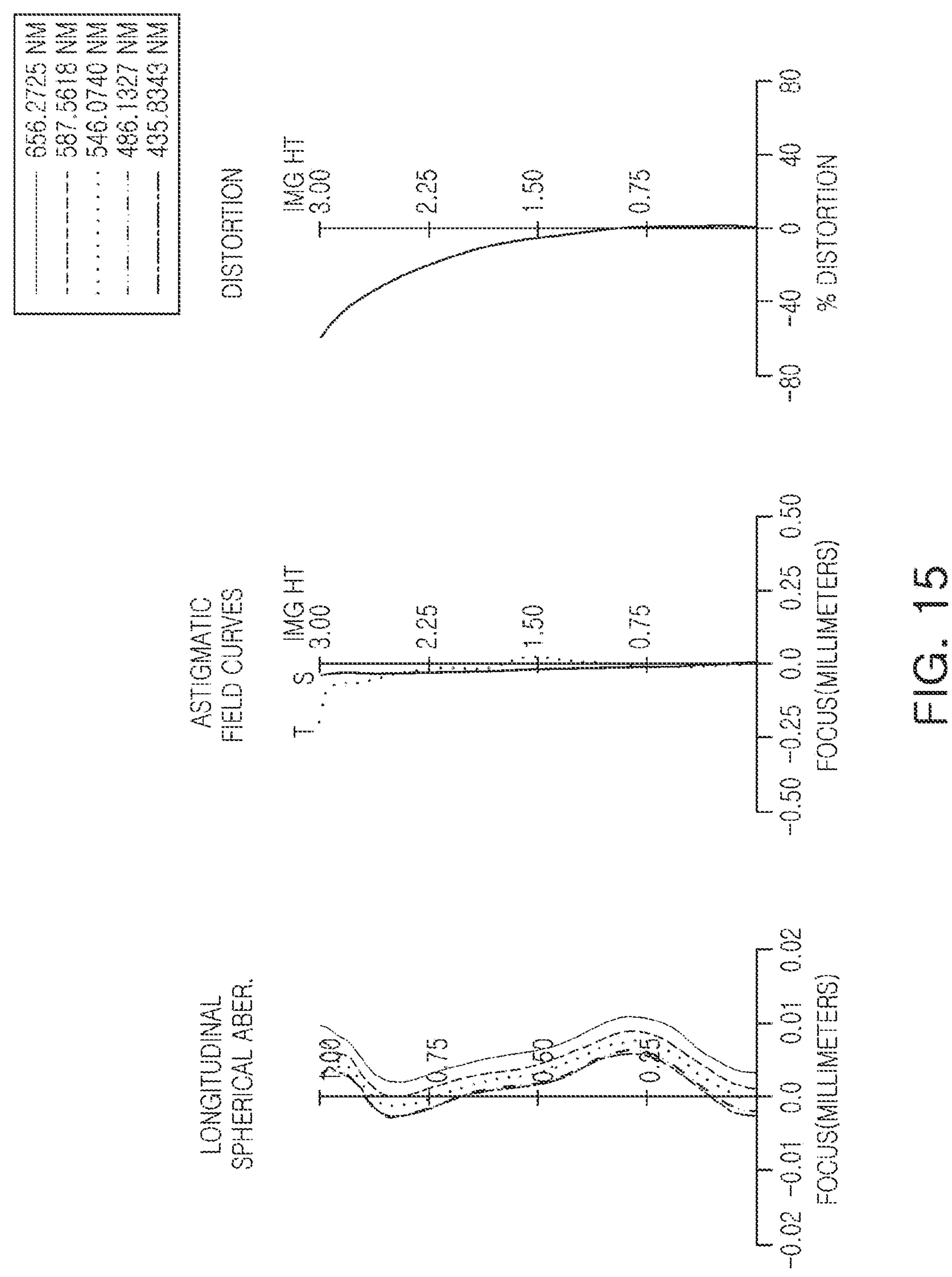
FIG. 15 is an aberration curve of the imaging lens system illustrated in FIG. 13.
Figure 16:
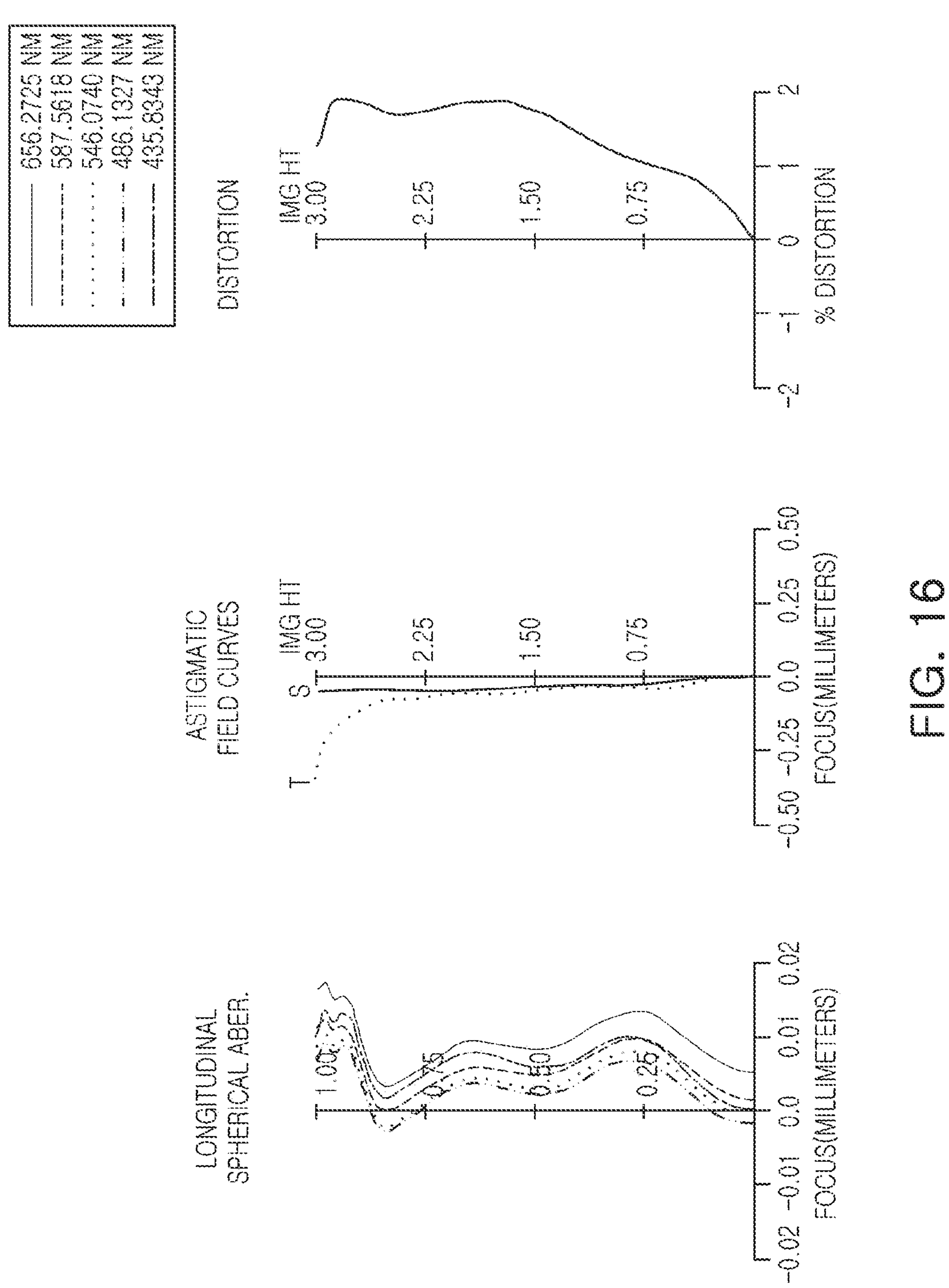
FIG. 16 is an aberration curve of the imaging lens system illustrated in FIG. 14.

The imaging lens system 400 configured as above exhibits different aberration characteristics as illustrated in FIGS. 15 and 16. Tables 10 to 12 illustrate lens characteristics and aspheric values of the imaging lens system according to the present embodiment.

TABLE 10

| Surface No. | Reference | Radius of curvature | Thickness/ distance | Refractive index | Abbe number | Focal length |
|---|---|---|---|---|---|---|
| S1 | First lens | 2.55633 | 0.35149 | 1.882 | 37.20 | −4.167 |
| S2 | | 1.41055 | d1 | | | |
| S3 | Second lens | 2.80951 | 0.88019 | 1.946 | 17.90 | −108.656 |
| S4 | | 2.31827 | 0.10000 | | | |
| S5 | Third lens | 2.11695 | 0.50037 | 1.516 | 64.10 | 2.626 |
| S6 | | −3.46722 | 0.10000 | | | |
| S7 | Fourth lens | 2.79332 | 0.35000 | 1.535 | 55.70 | 9.504 |
| S8 | | 5.92767 | d2 | | | |
| S9 | Fifth lens | 3.95935 | 0.25000 | 1.635 | 24.00 | −14.576 |
| S10 | | 2.70504 | 0.64245 | | | |
| S11 | Sixth lens | −2.46168 | 0.54967 | 1.589 | 61.20 | 2.420 |
| S12 | | −0.97743 | 0.27300 | | | |
| S13 | Seventh lens | 1.96292 | 0.37024 | 1.635 | 24.00 | −2.690 |
| S14 | | 0.84640 | d3 | | | |
| S15 | Imaging plane | | d4 | | | |

TABLE 11

| Reference | Wide-angle mode | Telephoto mode |
|---|---|---|
| d1 | 1.636 | 1.106 |
| d2 | 0.100 | 0.425 |
| d3 | 1.225 | 1.225 |
| d4 | 0.000 | 0.000 |

TABLE 12

| Reference | S14 |
|---|---|
| rN | 2.67 |
| k | −4.765483 |
| $a_0$ | −0.702177 |
| $a_1$ | 0.079720 |
| $a_2$ | −0.015847 |
| $a_3$ | −0.001304 |
| $a_4$ | −0.001923 |
| $a_5$ | −0.001332 |
| $a_6$ | 0.000515 |
| $a_7$ | −0.000535 |
| $a_8$ | 0.000346 |
| $a_9$ | −0.000229 |
| $a_{10}$ | 0.000070 |
| $a_{11}$ | −0.000013 |
| $a_{12}$ | 0.000068 |
| $a_{13}$ | −0.000029 |

In Table 12, rN refers to an effective diameter of the seventh lens.

Table 13 shows characteristic values of the imaging lens system according to the first to fourth embodiments.

TABLE 13

| Reference | First embodiment | Second embodiment | Third embodiment | Fourth embodiment |
|---|---|---|---|---|
| fw (mm) | 2.5690 | 2.5970 | 2.5690 | 2.4510 |
| ft (mm) | 3.0000 | 3.0000 | 3.0020 | 2.8940 |
| TTLw (mm) | 7.3584 | 7.4283 | 7.3283 | 7.3283 |
| TTLt (mm) | 7.1870 | 7.2935 | 7.1718 | 7.1228 |
| FOVw (°) | 140.0 | 140.0 | 140.0 | 140.0 |
| FOVt (°) | 90.0 | 90.0 | 90.0 | 90.0 |
| ImgHT (mm) | 3.000 | 3.000 | 3.000 | 3.000 |

The imaging lens system described herein may have the following characteristics. For example, a focal length of the imaging lens system is 2.4 to 3.2 mm, a TTL of the imaging lens system is 7.0 to 7.8 mm, a focal length of the first lens is −5.0 to −3.8 mm, a focal length of the second lens is −200 to −20 mm, a focal length of the third lens is 1.8 to 3.0 mm, a focal length of the fourth lens is 12 to 30 mm, a focal length of the fifth lens is −50 to −10 mm, a focal length of the sixth lens is 2.0 to 4.6 mm, and a focal length of the seventh lens is −4.6 to −2.0 mm.

Table 14 illustrates conditional expression values of the imaging lens system according to the first to fourth embodiments.

TABLE 14

| Conditional expression | First embodiment | Second embodiment | Third embodiment | Fourth embodiment |
|---|---|---|---|---|
| FOVw/fw | 54.4959 | 53.9084 | 54.4959 | 57.1195 |
| FOVw/TTLw | 19.0260 | 18.8469 | 19.1041 | 19.1041 |
| D12/D45 | 10.6799 | 10.9532 | 16.0886 | 16.3577 |
| TTLmax/ TTLmin | 1.0239 | 1.0185 | 1.0218 | 1.0289 |
| ImgHT/fG3 | −0.0371 | 0.1620 | 0.0975 | 0.1207 |
| R1/ImgHT | 0.6990 | 0.6464 | 0.8608 | 0.8521 |
| VG2/VG3 | 1.2469 | 1.2610 | 1.2610 | 1.2610 |
| d0S14/ImgHT | 0.5714 | 0.7325 | 0.7705 | 0.7482 |
| SagS14/T7 | 0.7691 | 1.2265 | 1.7107 | 1.5589 |
| G1m/G2m | −0.5557 | −0.4513 | −0.4553 | −0.6332 |

As set forth above, according to the present disclosure, an imaging lens system that can be mounted on a small camera module and can adjust focus magnification may be provided.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:

a first lens, a second lens, a third lens, a fourth lens, a fifth lens, a sixth lens, and a seventh lens, sequentially disposed from an object side, wherein the imaging lens system comprises a total of seven lenses with refractive power, wherein the fourth lens has a convex object-side surface, the fifth lens has a convex object-side surface and a concave image-side surface, and the seventh lens has a convex object-side surface in a paraxial region, wherein a field of view (FOV) is wider than 85 degrees and narrower than 160 degrees, wherein a distance (TTL) from an object-side surface of the first lens to an imaging plane is greater than 6.0 mm and less than 9.0 mm, and wherein $1.0<TTLw/TTLt<1.1$, where TTLw is a distance from an object-side surface of the first lens to the imaging plane in a wide-angle mode of the imaging lens system, and TTLt is a distance from an object-side surface of the first lens to the imaging plane in a telephoto mode of the imaging lens system.

2. The imaging lens system of claim 1, wherein the first lens has negative refractive power.

3. The imaging lens system of claim 1, wherein the fourth lens has positive refractive power.

4. The imaging lens system of claim 1, wherein the sixth lens has a concave object-side surface.

5. The imaging lens system of claim 1, wherein the following conditional expression is satisfied, $25<FOVw/fw<60$, where FOVw is a field of view in a wide-angle mode of the imaging lens system, and fw is a focal length in a wide-angle mode of the imaging lens system.

6. The imaging lens system of claim 1, wherein the following conditional expression is satisfied, $15<FOVw/TTLw<25$, where FOVw is a field of view in a wide-angle mode of the imaging lens system.

7. The imaging lens system of claim 1, wherein the following conditional expression is satisfied, $2.0<D12/D45<17$, where D12 is a distance from an image-side surface of the first lens to an object-side surface of the second lens, and D45 is a distance from an image-side surface of the fourth lens to an object-side surface of the fifth lens.

8. A camera module comprising:

the imaging lens system of claim 1; and an image sensor having the imaging plane disposed in a position in which light incident through the first lens to the seventh lens is formed.

9. An imaging lens system, comprising:

a first lens having negative refractive power and a convex object-side surface;

a second lens having negative refractive power and a convex object-side surface;

a third lens having refractive power;

a fourth lens having refractive power, a convex object-side surface, and a concave image-side surface;

a fifth lens having refractive power;

a sixth lens having refractive power and a concave object-side surface; and a seventh lens having negative refractive power and a convex object-side surface in a paraxial region, wherein the first to seventh lenses are sequentially disposed with an air gap from an object side, and the imaging lens system has a total of seven lenses with refractive power.

10. The imaging lens system of claim 9, wherein the third lens has a convex image-side surface.

11. The imaging lens system of claim 9, wherein the fifth lens has a concave image-side surface.

12. The imaging lens system of claim 9, wherein the sixth lens has a convex image-side surface.

13. The imaging lens system of claim 9, wherein the seventh lens has a shape in which an inflection point is formed on at least one of an object-side surface and an image-side surface.

14. The imaging lens system of claim 9, wherein at least one of the following conditional expressions are satisfied, $$-0.1 < ImgHT/fG3 < 0.2,$$

$$0.6 < R1/ImgHT < 0.7, \text{ and}$$

$$1.2 < VG2/VG3 < 1.3,$$

where ImgHT is a height of an imaging plane, fG3 is a composited focal length of the fifth lens to the seventh lens, R1 is a radius of curvature of an object-side surface of the first lens, VG2 is an average of Abbe numbers of the second lens to the fourth lens, and VG3 is an average of Abbe numbers of the fifth lens to the seventh lens.

15. A camera module comprising:

the imaging lens system of claim 9; and an image sensor having an imaging plane disposed in a position in which light incident through the first lens to the seventh lens is formed.

16. An imaging lens system, comprising:

a first lens group, a second lens group, and a third lens group disposed on an optical axis in this order from an object side, wherein a first lens of the first lens group has a convex object-side surface, wherein the first lens group and the second lens group are movable relative to each other in an optical axis direction between a wide-angle mode position and a telephoto mode position, wherein a field of view (FOV) is wider than 80 degrees, and the imaging lens system has a total of seven lenses with refractive power, and wherein the second lens group comprises a second lens through a fourth lens, and the third lens group comprises a fifth lens through a seventh lens disposed in this order.

17. The imaging lens system of claim 16, wherein a distance (TTL) from an object-side surface of a first lens of the first lens group to an imaging plane is less than or equal to 7.5 mm.

18. The imaging lens system of claim 16, wherein the third lens has a convex image-side surface.

19. The imaging lens system of claim 16, wherein the fourth lens has a convex object-side surface.

20. The imaging lens system of claim 16, wherein the fifth lens has a convex object-side surface.

21. A camera module comprising:

the imaging lens system of claim 16; and an image sensor having an imaging plane disposed in a position in which light incident through the first lens group to the third lens group is formed.

* * * * *